US012437725B2

(12) United States Patent
Park

(10) Patent No.: US 12,437,725 B2
(45) Date of Patent: Oct. 7, 2025

(54) DISPLAY DEVICE FOR REDUCING PERIPHERAL AREA SURROUNDING A DISPLAY AREA

(71) Applicant: Samsung Display Co., Ltd., Yongin-si (KR)

(72) Inventor: Gyungsoon Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/866,361

(22) Filed: Jul. 15, 2022

(65) Prior Publication Data

US 2023/0022927 A1 Jan. 26, 2023

(30) Foreign Application Priority Data

Jul. 26, 2021 (KR) ........................ 10-2021-0098109

(51) Int. Cl.
*G09G 3/3275* (2016.01)
*G09G 3/3233* (2016.01)

(52) U.S. Cl.
CPC ......... *G09G 3/3275* (2013.01); *G09G 3/3233* (2013.01); *G09G 2300/0413* (2013.01); *G09G 2300/0452* (2013.01); *G09G 2300/0819* (2013.01); *G09G 2300/0842* (2013.01);
(Continued)

(58) Field of Classification Search
CPC .......... G09G 3/2092–2096; G09G 3/30–3258; G09G 3/3275–3291; G09G 2300/0404–0413; G09G 2300/0421–0426; G09G 2300/0452; G09G 2300/0804; G09G 2300/0819; G09G 2300/0842; G09G 2310/0272; G09G 2310/0275; G09G 2310/0281; G09G 2310/0283; G09G 2310/0297; G09G 2330/021; H10K 59/10–12;
(Continued)

(56) References Cited

U.S. PATENT DOCUMENTS

| | | | |
|---|---|---|---|
| 9,305,480 | B2 | 4/2016 | Kang et al. |
| 9,754,537 | B2 | 9/2017 | Lee et al. |
| 2012/0019500 | A1 | 1/2012 | Hwang et al. |

(Continued)

FOREIGN PATENT DOCUMENTS

| | | |
|---|---|---|
| KR | 10-0598740 B1 | 7/2006 |
| KR | 10-1761636 B1 | 7/2017 |

(Continued)

*Primary Examiner* — Keith L Crawley
(74) *Attorney, Agent, or Firm* — Womble Bond Dickinson (US) LLP

(57) ABSTRACT

A display device includes: a data distribution circuit between a display area and a data driving circuit in a peripheral area, wherein the data distribution circuit includes: a plurality of first demultiplexers configured to receive a data signal output via a first output line from the data driving circuit and to transmit the data signal to a pair of first data lines from among the plurality of data lines; and a plurality of second demultiplexers configured to receive, through a corresponding conductive line from among the plurality of conductive lines, a data signal output via a second output line from the data driving circuit and to transmit the data signal to a pair of second data lines from among the plurality of data lines.

22 Claims, 18 Drawing Sheets

(52) U.S. Cl.
CPC ............... *G09G 2310/0297* (2013.01); *G09G 2330/021* (2013.01)

(58) Field of Classification Search
CPC .... H10K 59/131; H10K 59/35; H10K 59/353; H10K 59/805; H10K 59/82–84; H10K 59/88
See application file for complete search history.

(56) References Cited

U.S. PATENT DOCUMENTS

| | | | | |
|---|---|---|---|---|
| 2017/0110041 | A1* | 4/2017 | Watsuda | G09G 3/20 |
| 2017/0358641 | A1* | 12/2017 | Park | H10K 77/111 |
| 2019/0181211 | A1* | 6/2019 | Bae | G09G 3/3225 |
| 2020/0127217 | A1* | 4/2020 | Bae | H10K 77/111 |
| 2020/0184871 | A1* | 6/2020 | Hong | G09G 3/20 |
| 2020/0227503 | A1* | 7/2020 | Yi | H01L 27/1244 |
| 2020/0380918 | A1 | 12/2020 | Cho et al. | |
| 2020/0381505 | A1 | 12/2020 | Cho et al. | |
| 2020/0394967 | A1 | 12/2020 | Park et al. | |
| 2021/0074218 | A1* | 3/2021 | Shin | G09G 3/2096 |
| 2021/0082343 | A1* | 3/2021 | Lee | H10K 59/40 |
| 2021/0104192 | A1* | 4/2021 | Huang | G09G 3/20 |
| 2021/0273035 | A1* | 9/2021 | Cho | H10K 77/111 |

FOREIGN PATENT DOCUMENTS

| | | | | |
|---|---|---|---|---|
| KR | 10-2035718 | B1 | 10/2019 | |
| KR | 10-2020-0010697 | A | 1/2020 | |
| KR | 10-2020-0136520 | A | 12/2020 | |
| KR | 10-2020-0136546 | A | 12/2020 | |
| KR | 10-2020-0143558 | A | 12/2020 | |
| KR | 10-22-0091637 | | 1/2022 | |
| WO | WO-2020017835 | A1 * | 1/2020 | H01L 27/3272 |

* cited by examiner

DISPLAY DEVICE FOR REDUCING PERIPHERAL AREA SURROUNDING A DISPLAY AREA

CROSS-REFERENCE TO RELATED APPLICATION

The present application claims priority to and the benefit of Korean Patent Application No. 10-2021-0098109, filed on Jul. 26, 2021, in the Korean Intellectual Property Office, the entire disclosure of which is incorporated herein by reference.

BACKGROUND

1. Field

Aspects of one or more embodiments relate to a display device.

2. Description of the Related Art

As the field of displays for visually representing various types of electrical signal information rapidly develops, various display devices having relatively excellent characteristics such as thin profile, light weight, and relatively low power consumption have been introduced. Display devices may have a dead area outside of the display area that may diminish the user experience.

The above information disclosed in this Background section is only for enhancement of understanding of the background and therefore the information discussed in this Background section does not necessarily constitute prior art.

SUMMARY

Aspects of one or more embodiments relate to a display device having a relatively reduced dead area that is capable of displaying high-resolution images.

The technical characteristics of embodiments according to the present disclosure are not limited to the technical characteristics described above, and other technical characteristics not described herein will be more clearly understood from the present description by those of ordinary skill in the art.

Additional aspects will be set forth in part in the description which follows and, in part, will be apparent from the description, or may be learned by practice of the presented embodiments of the disclosure.

According to one or more embodiments, a display device includes a substrate including a display area and a peripheral area outside the display area, a plurality of data lines arranged in the display area, a plurality of conductive lines arranged in the display area, a data driving circuit arranged in the peripheral area and configured to output a data signal, and a data distribution circuit arranged between the display area and the data driving circuit in the peripheral area, wherein the data distribution circuit includes a plurality of first demultiplexers configured to receive a data signal output via a first output line from the data driving circuit and transmit the data signal to a pair of first data lines from among the plurality of data lines, and a plurality of second demultiplexers configured to receive a data signal output via a second output line from the data driving circuit and transmit the data signal to a corresponding conductive line connected to a pair of second data lines from among the plurality of data lines, from among the plurality of conductive lines.

According to some embodiments, a length of the display area in a first direction may be less than that in a second direction vertical to the first direction, wherein the first direction may be an extension direction of the data lines.

According to some embodiments, the peripheral area may include a first non-display area surrounding the display area and a second non-display area outside the first non-display area, wherein the data distribution circuit may be arranged in the first non-display area, wherein the data driving circuit may be arranged in the second non-display area, wherein a bending area may be between the data distribution circuit and the data driving circuit.

According to some embodiments, each of the conductive lines may include a first portion and a third portion extending in an extension direction of the data lines and a second portion connecting the first portion and the third portion to each other, wherein the first portion and the third portion may face each other, wherein the third portion may be closer to an edge of the substrate than the first portion is.

According to some embodiments, each of the conductive lines may include the first portion connected to the second output line and the third portion connected to the second demultiplexer.

According to some embodiments, the data driving circuit may be configured to output first to third color data signals in an arrangement order of first data lines of first to third columns, respectively, via a plurality of first output lines and output the first to third color data signals in a reverse order of an arrangement of second data lines of first to third columns, respectively, via a plurality of second output lines.

According to some embodiments, the display area may include a first sub-area in which a plurality of first data lines from among the plurality of data lines are arranged and a second sub-area in which a plurality of second data lines from among the plurality of data lines are arranged, wherein the second sub-area may be closer to an edge of the substrate than the first sub-area is.

According to some embodiments, each of the conductive lines may include a first portion arranged in the first sub-area and parallel to the first data lines, a third portion arranged in the second sub-area and parallel to the second data lines, and a second portion connecting the first portion and the third portion to each other.

According to some embodiments, the first portion may be connected to the second output line, wherein the third portion may be connected to the second demultiplexer.

According to some embodiments, the display device may further include a plurality of dummy lines arranged in columns of the first sub-area where first portions of the conductive lines are not arranged and columns of the second sub-area where third portions of the conductive lines are not arranged.

According to one or more embodiments, a display device includes a plurality of data lines arranged in a display area, a plurality of conductive lines arranged in the display area, a data driving circuit arranged in a peripheral area outside the display area and configured to output a data signal, and a data distribution circuit arranged in the peripheral area and configured to transmit the data signal to the data lines, wherein each of the conductive lines includes a first portion and a third portion extending in a first direction in which the data lines extend and a second portion connecting the first portion and the third portion to each other, wherein the display area includes a first sub-area in which first portions of the conductive lines are arranged and a second sub-area in which third portions of the conductive lines are arranged, wherein the data distribution circuit includes a plurality of first demultiplexers configured to transmit a data signal received from the data driving circuit to first data lines arranged in the first sub-area from among the data lines, and a plurality of second demultiplexers configured to transmit a data signal received from the data driving circuit to second data lines arranged in the second sub-area from among the data lines through the conductive lines.

According to some embodiments, a length of the display area in the first direction may be less than that in a second direction vertical to the first direction.

According to some embodiments, the peripheral area may include a first non-display area surrounding the display area and a second non-display area outside the first non-display area, wherein the data distribution circuit may be arranged in the first non-display area, wherein the data driving circuit may be arranged in the second non-display area, wherein a bending area may be between the data distribution circuit and the data driving circuit.

According to some embodiments, the second sub-area may be outside the first sub-area, wherein the second non-display area may correspond to the first sub-area and may have no portion corresponding to the second sub-area.

According to some embodiments, the data driving circuit may be configured to output first to third color data signals in an arrangement order of first data lines of first to third columns, respectively, and output the first to third color data signals in a reverse order of an arrangement of second data lines of first to third columns, respectively.

According to some embodiments, each of the first demultiplexers may include a 1-1 sub-demultiplexer between a first output line configured to output the first color data signal and a pair of first data lines configured to receive the first color data signal, a 1-2 sub-demultiplexer between a first output line configured to output the second color data signal and another pair of first data lines configured to receive the second color data signal, and a 1-3 sub-demultiplexer between a first output line configured to output the third color data signal and another pair of first data lines configured to receive the third color data signal.

According to some embodiments, each of the second demultiplexers may include a 2-1 sub-demultiplexer between a first conductive line connected to a second output line configured to output the first color data signal and configured to receive the first color data signal and a pair of second data lines, a 2-2 sub-demultiplexer between a second conductive line connected to a second output line configured to output the second color data signal and configured to receive the second color data signal and another pair of second data lines, and a 2-3 sub-demultiplexer between a third conductive line connected to a second output line configured to output the third color data signal and configured to receive the third color data signal and another pair of second data lines.

According to some embodiments, the first demultiplexers may include first switches configured to be turned on according to a first control signal and second switches configured to be turned on according to a second control signal applied at a different timing from the first control signal, wherein the second demultiplexers may include third switches configured to be turned on according to the first control signal and fourth switches configured to be turned on according to the second control signal.

According to some embodiments, the first portion of each of the conductive lines may be connected to an output line of the data driving circuit, wherein the third portion of each of the conductive lines may be connected to a corresponding second demultiplexer from among the plurality of second demultiplexers.

According to some embodiments, the display device may further include a plurality of dummy lines arranged in columns of the first sub-area where the first portions of the conductive lines are not arranged and columns of the second sub-area where the third portions of the conductive lines are not arranged.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
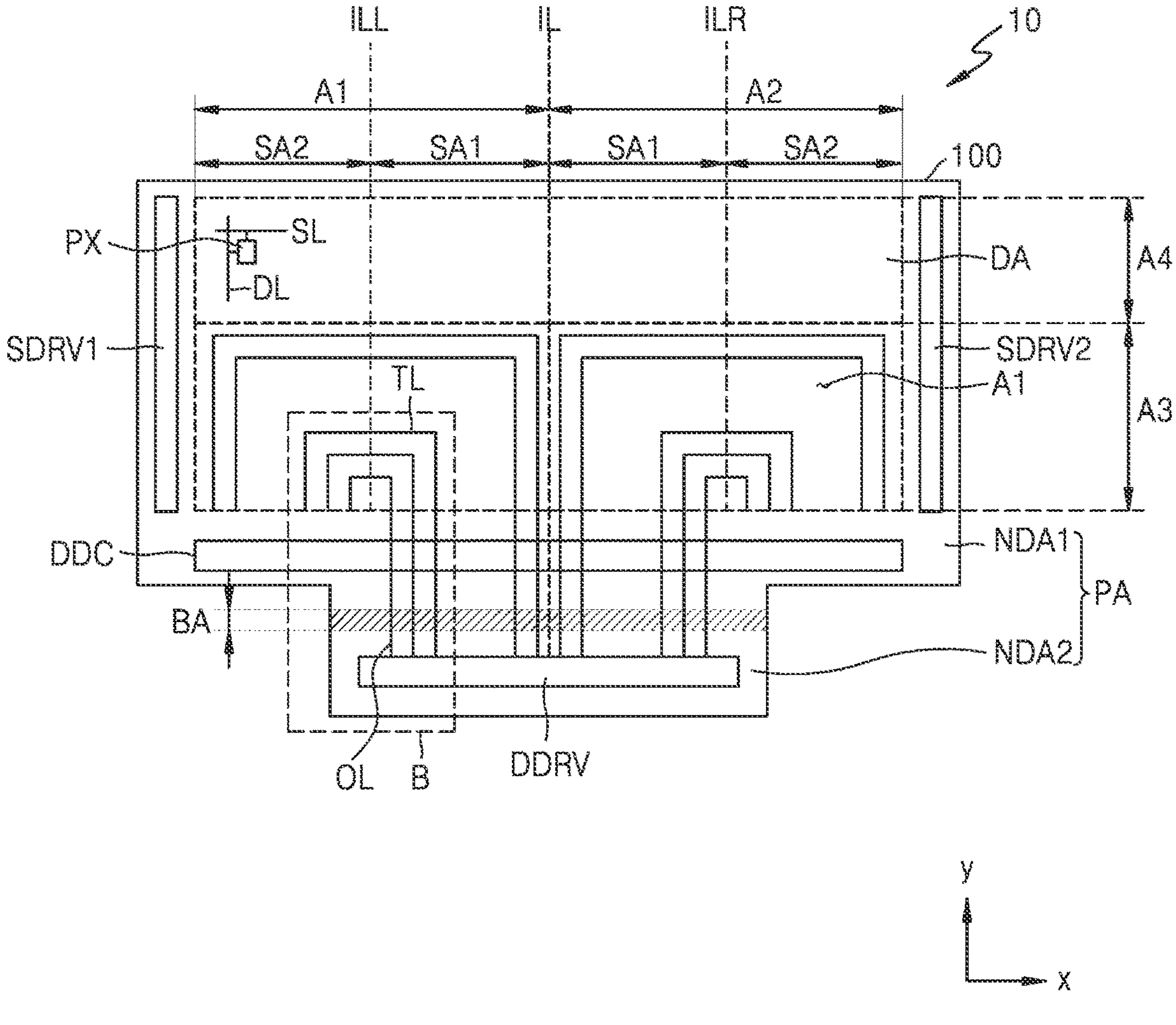
FIG. 1 is a schematic plan view of a display panel according to some embodiments.

Reference will now be made in more detail to aspects of some embodiments, which are illustrated in the accompanying drawings, wherein like reference numerals refer to like elements throughout. In this regard, the present embodiments may have different forms and should not be construed as being limited to the descriptions set forth herein. Accordingly, aspects of some embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present description allows for various changes and numerous embodiments, certain embodiments will be illustrated in the drawings and described in the written description. Effects and features of one or more embodiments and methods of accomplishing the same will become apparent from the following detailed description of the one or more embodiments, taken in conjunction with the accompanying drawings. However, the present embodiments may have different forms and should not be construed as being limited to the descriptions set forth herein.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "include," "comprise," and "have" as used herein specify the presence of stated features or elements but do not preclude the addition of one or more other features or elements.

It will be further understood that, when a layer, region, or element is referred to as being on another layer, region, or element, it may be directly or indirectly on the other layer, region, or element. That is, for example, intervening layers, regions, or elements may be present.

Sizes of elements in the drawings may be exaggerated or reduced for convenience of description. In other words, since sizes and thicknesses of elements in the drawings are arbitrarily illustrated for convenience of description, the following embodiments are not limited thereto.

As used herein, the expression "A and/or B" refers to A, B, or A and B. In addition, the expression "at least one of A and B" refers to A, B, or A and B.

In the embodiments below, when a wire is described as "extending in a first direction or a second direction," the description covers not only a case where the wire extends in a straight shape but also a case where the wire extends in a zigzag or curved shape in the first direction or the second direction.

In the embodiments below, the description "in a plan view" is made when a target portion is seen from above, and the description "in a cross-sectional view" is made when a vertical cross-section of a target portion is seen from the side. In the embodiments below, when a first element is described as "overlapping" a second element, the first element may be above or below the second element.

In the embodiments below, when X and Y are described as being connected to each other, the description may cover a case where X and Y are electrically connected to each other, a case where X and Y are functionally connected to each other, and a case where X and Y are directly connected to each other. In this regard, X and Y may denote objects (e.g., devices, elements, circuits, wires, electrodes, terminals, conductive films, layers, etc.). Accordingly, one or more embodiments are not limited to a certain connection relationship, for example, the connection relationship illustrated in the drawings or described in the written description, and may also include one other than the connection relationship illustrated in the drawings or described in the written description.

FIG. 1 is a schematic plan view of a display panel 10 according to some embodiments.

A display device may include the display panel 10. The display panel 10 may have a rectangular shape, as shown in FIG. 1 in a plan view. One pair of sides from among two pairs of sides of the rectangle may be longer than the other pair of sides. In the display panel 10 shown in FIG. 1, a first direction (a direction x) denotes an extension direction of long sides, a second direction (a direction y) denotes an extension direction of short sides, and a third direction (a direction z) denotes a direction vertical to the extension directions of the long and short sides. At least one corner of the display panel 10 may have a round shape.

Referring to FIG. 1, the display panel 10 may include a display area DA in which a plurality of pixels PX are arranged and a peripheral area PA outside the display area DA. The peripheral area PA may be a non-display area in which the pixels PX are not arranged. The display area DA may be entirely surrounded by the peripheral area PA. Various elements constituting the display panel 10 are arranged on a substrate 100. Accordingly, the substrate 100 may include the display area DA and the peripheral area PA.

The plurality of pixels PX and signal lines configured to apply an electrical signal to the plurality of pixels PX may be arranged in the display area DA.

The plurality of pixels PX may be arranged in various forms, such as a stripe arrangement, a PenTile arrangement, and a mosaic arrangement, in the display area DA to display images. According to some embodiments, a length of the display area DA in the first direction may be greater than that in the second direction. For example, in the display area DA, m pixels PX may be arranged in the first direction, and n pixels PX may be arranged in the second direction, and in this regard, m may be a natural number greater than n, and n may be a natural number greater than 1.

Each of the plurality of pixels PX may include a display element such as an organic light-emitting diode. The display element may be connected to a pixel circuit for driving the display element.

The signal lines configured to apply an electrical signal to the plurality of pixels PX may include a plurality of scan lines SL extending in the first direction and a plurality of data lines DL extending in the second direction. The plurality of scan lines SL may be spaced apart from each other in the second direction and may be configured to transmit a scan signal to the pixels PX. The plurality of data lines DL may be spaced apart from each other in the first direction and may be configured to transmit a data signal to the pixels PX. Each of the plurality of pixels PX may be connected to at least one corresponding scan line SL from among the plurality of scan lines SL and a corresponding data line DL from among the plurality of data lines DL.

Conductive lines TL may be further arranged in the display area DA. The conductive lines TL may be bypass lines for transmitting a data signal supplied from a data driving circuit DDRV to some data lines DL connected to the pixels PX. The conductive lines TL arranged on a left side of an imaginary line IL passing through substantially a center of the substrate 100 in the first direction and the conductive lines TL arranged on a right side of the imaginary line IL may be substantially symmetrical with respect to the imaginary line IL.

The display area DA may be divided into a first area A1 on the left and a second area A2 on the right, based on the imaginary line IL. The first area A1 and the second area A2 may each include a first sub-area SA1 and a second sub-area SA2, based on a left imaginary line ILL and a right imaginary line ILR. The number of data lines DL arranged in the first area A1 may be the same as the number of data lines DL arranged in the second area A2. The number of data lines DL arranged in the first sub-area SA1 may be the same as the number of data lines DL arranged in the second sub-area SA2.

Also, the display area DA may be divided into a third area A3 and a fourth area A4, depending on whether the conductive lines TL are arranged or not. The third area A3 may be an area in which the conductive lines TL are arranged, and the fourth area A4 may be an area except the third area A3. The fourth area A4 may be an area in which the conductive lines TL are not arranged.

The peripheral area PA may include a first non-display area NDA1 and a second non-display area NDA2 outside the first non-display area NDA1. The second non-display area NDA2 substantially corresponds to first sub-areas SA1 of the display area DA and has no portion corresponding to second sub-areas SA2 of the display area DA.

A first scan driving circuit SDRV1 and a second scan driving circuit SDRV2 for driving the pixel circuit, a data distribution circuit DDC, and the data driving circuit DDRV may be arranged in the peripheral area PA. The first scan driving circuit SDRV1, the second scan driving circuit SDRV2, and the data distribution circuit DDC may be arranged in the first non-display area NDA1, and the data driving circuit DDRV may be arranged in the second non-display area NDA2.

The first scan driving circuit SDRV1 and the second scan driving circuit SDRV2 may generate a scan signal and transmit the scan signal to each pixel PX through the scan line SL. According to some embodiments, the first scan driving circuit SDRV1 may be arranged on a left side of the display area DA, and the second scan driving circuit SDRV2 may be arranged on a right side of the display area DA. However, embodiments according to the present disclosure are not limited thereto. According to some embodiments, only one scan driving circuit may be provided on the left or right side.

According to some embodiments, the data driving circuit DDRV may be directly arranged on the second non-display area NDA2 of the substrate 100 in a chip-on-glass (COG) or chip-on-plastic (COP) manner. According to some embodiments, a plurality of terminals (or pads) may be arranged in the second non-display area NDA2, and a circuit board on which the data driving circuit DDRV is arranged, for example, a flexible printed circuit board (FPCB), may be electrically connected to the plurality of terminals of the second non-display area NDA2.

According to some embodiments, the data driving circuit DDRV may include a plurality of data driving circuits DDRV. For example, the data driving circuit DDRV may include a first data driving circuit and a second data driving circuit. The first data driving circuit may correspond to the first sub-area SA1 of the first area A1 and may generate and output a data signal of the pixels PX provided in the first area A1 in the display area DA. The second data driving circuit may be provided in the first sub-area SA1 of the second area A2 and may generate and output a data signal of the pixels PX provided in the second area A2 in the display area DA.

The data distribution circuit DDC may be between the display area DA and the data driving circuit DDRV. The data distribution circuit DDC may transmit a data signal received from the data driving circuit DDRV to each pixel PX through the data line DL. The data distribution circuit DDC may include a plurality of demultiplexers DMX as described below with reference to FIGS. 3 and 6.

The second non-display area NDA2 may include a bending area BA. The bending area BA may be between the data distribution circuit DDC and the data driving circuit DDRV. As the substrate 100 is bent at the bending area BA, at least a portion of the data driving circuit DDRV may overlap the display area DA. A bending direction may be set so that the data driving circuit DDRV may be positioned behind the display area DA without covering the display area DA. Accordingly, a user comes to recognize the display area DA as occupying most of the display device.

Although an organic light-emitting display device including an organic light-emitting diode as a display element is described below as an example for convenience, a display device described herein is not limited thereto. According to some embodiments, various display devices such as an inorganic light-emitting display device (or an inorganic electroluminescent (EL) display device), a nano light-emitting display device, and a quantum dot light-emitting display device may be used.

Figure 2A:
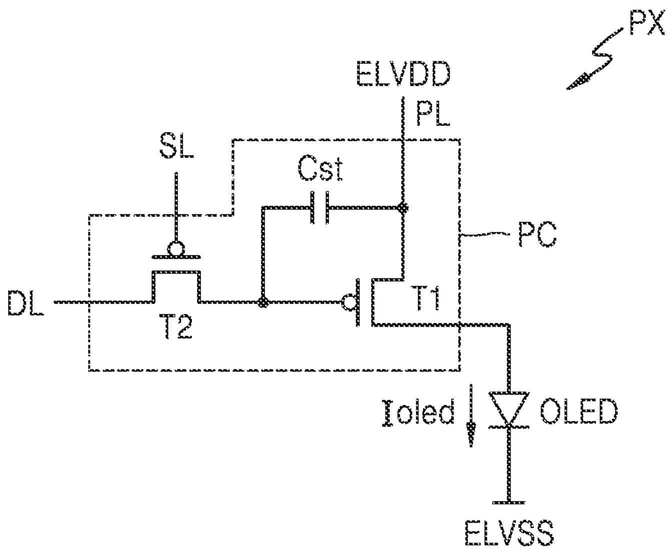
FIGS. 2A and 2B are equivalent circuit diagrams of a pixel according to some embodiments.
Figure 2B:
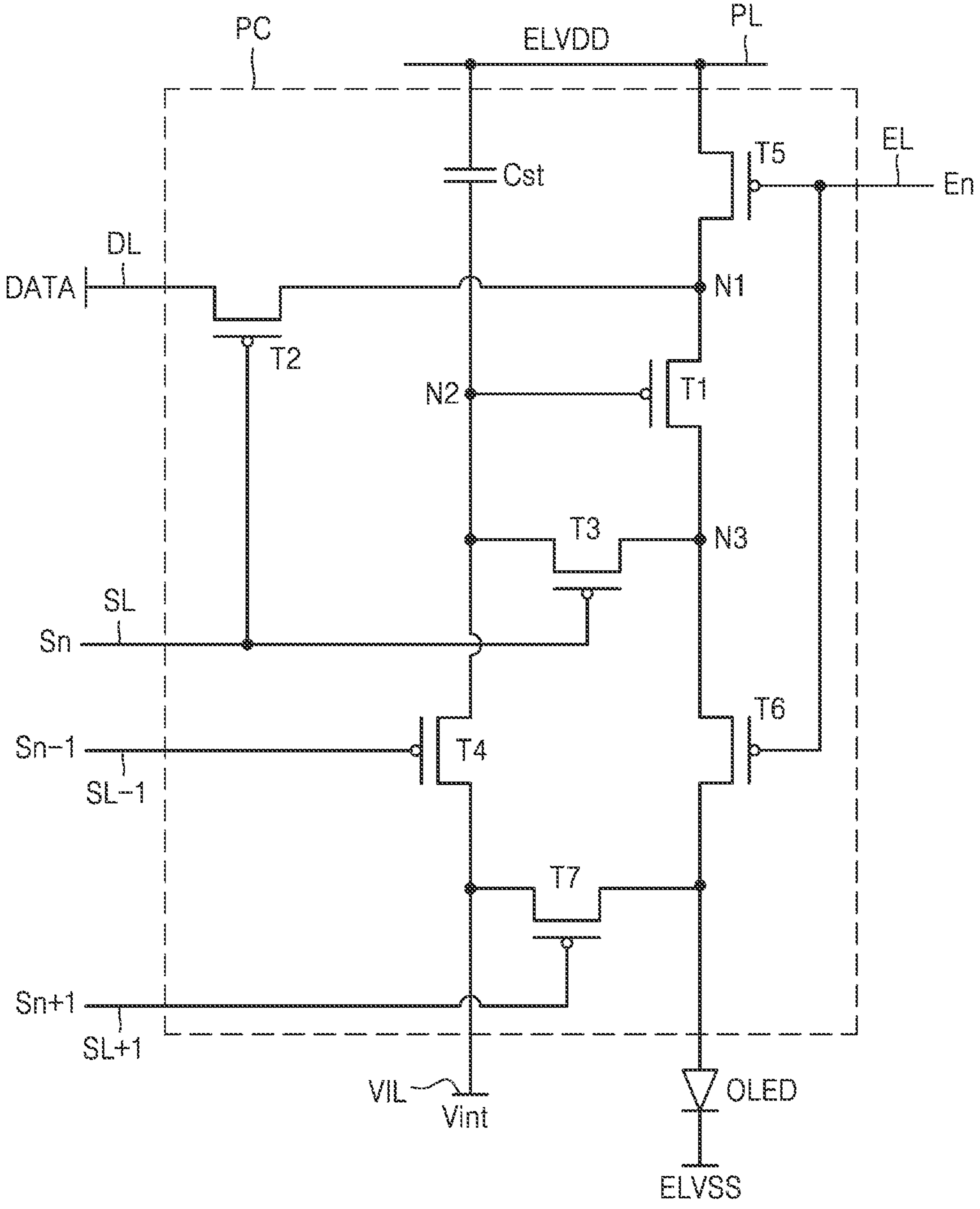

FIGS. 2A and 2B are equivalent circuit diagrams of the pixel PX according to some embodiments.

Referring to FIG. 2A, the pixel PX includes a pixel circuit PC and an organic light-emitting diode OLED connected to the pixel circuit PC. The pixel circuit PC may include a first transistor T1, a second transistor T2, and a capacitor Cst. Each pixel PX may emit, for example, red, green, blue, or white light, through the organic light-emitting diode OLED. The first transistor T1 and the second transistor T2 may be implemented as thin-film transistors.

The second transistor T2, which is a switching transistor, may be connected to the scan line SL and the data line DL and may be configured to transmit a data signal input from the data line DL to the first transistor T1 in response to a scan signal input from the scan line SL. The capacitor Cst may be connected to the second transistor T2 and a driving voltage line PL and may store a voltage that is a difference between a voltage corresponding to a data signal received from the second transistor T2 and a driving voltage ELVDD supplied to the driving voltage line PL.

The first transistor T1, which is a driving transistor, may be connected to the driving voltage line PL and the capacitor Cst and may control a driving current $I_{oled}$ flowing through the organic light-emitting diode OLED from the driving voltage line PL in response to a voltage value stored in the capacitor Cst. The organic light-emitting diode OLED may emit light having certain brightness according to the driving current $I_{oled}$. An opposite electrode of the organic light-emitting diode OLED may receive a common voltage ELVSS.

Although FIG. 2A shows the pixel circuit PC including two transistors and one capacitor, embodiments according to the present disclosure are not limited thereto. The number of transistors and the number of capacitors may be variously changed according to the design of the pixel circuit PC.

Referring to FIG. 2B, the pixel circuit PC may include the first transistor T1, which is a driving transistor, and the second transistor T2 to a seventh transistor T7, which are switching transistors. Depending on the type (P-type or N-type) and/or operation condition of a transistor, a first terminal of each of the first to seventh transistors T1 to T7 may be a source terminal or a drain terminal, and a second terminal thereof may be a terminal different from the first terminal. For example, the first terminal may be a source terminal, and the second terminal may be a drain terminal. According to some embodiments, the source terminal and the drain terminal may be interchangeably referred to as a source electrode and a drain electrode, respectively.

The pixel circuit PC may be connected to a first scan line SL configured to transmit a first scan signal Sn, a second scan line SL−1 configured to transmit a second scan signal Sn−1, a third scan line SL+1 configured to transmit a third scan signal Sn+1, an emission control line EL configured to transmit an emission control signal En, the data line DL configured to transmit a data signal DATA, the driving voltage line PL configured to transmit the driving voltage ELVDD, and an initialization voltage line VIL configured to transmit an initialization voltage Vint.

The first transistor T1 may be connected between the driving voltage line PL and the organic light-emitting diode OLED. The first transistor T1 may be connected to the driving voltage line PL via the fifth transistor T5 and may be electrically connected to the organic light-emitting diode OLED via the sixth transistor T6. The first transistor T1 includes a gate terminal connected to a second node N2, a first terminal connected to a first node N1, and a second terminal connected to a third node N3. The first transistor T1 may receive the data signal DATA according to a switching operation of the second transistor T2 and supply a driving current to the organic light-emitting diode OLED.

The second transistor T2 (a data writing transistor) may be connected between the data line DL and the first node N1 and may be connected to the driving voltage line PL via the fifth transistor T5. The first node N1 may be a node to which the first transistor T1 and the fifth transistor T5 are connected. The second transistor T2 includes a gate terminal connected to the first scan line SL, a first terminal connected to the data line DL, and a second terminal connected to the first node N1 (or the first terminal of the first transistor T1). The second transistor T2 may be turned on according to the first scan signal Sn received through the first scan line SL to perform a switching operation for transmitting the data signal DATA transmitted through the data line DL to the first node N1.

The third transistor T3 (a compensation transistor) may be connected between the second node N2 and the third node N3. The third transistor T3 may be connected to the organic light-emitting diode OLED via the sixth transistor T6. The second node N2 may be a node to which the gate terminal of the first transistor T1 is connected, and the third node N3 may be a node to which the first transistor T1 and the sixth transistor T6 are connected. The third transistor T3 includes a gate terminal connected to the first scan line SL, a first terminal connected to the second node N2 (or the gate terminal of the first transistor T1), and a second terminal connected to the third node N3 (or the second terminal of the first transistor T1). The third transistor T3 may be turned on according to the first scan signal Sn received through the first scan line SL to diode-connect the first transistor T1, thereby compensating for a threshold voltage of the first transistor T1.

The fourth transistor T4 (a first initialization transistor) may be connected between the second node N2 and the initialization voltage line VIL. The fourth transistor T4 includes a gate terminal connected to the second scan line SL−1, a first terminal connected to the second node N2, and a second terminal connected to the initialization voltage line VIL. The fourth transistor T4 may be turned on according to the second scan signal Sn−1 received through the second scan line SL−1 to initialize a gate voltage of the first transistor T1 by transmitting the initialization voltage Vint to the gate terminal of the first transistor T1.

The fifth transistor T5 (a first emission control transistor) may be connected between the driving voltage line PL and the first node N1. The sixth transistor T6 (a second emission control transistor) may be connected between the third node N3 and the organic light-emitting diode OLED. The fifth transistor T5 includes a gate terminal connected to the emission control line EL, a first terminal connected to the driving voltage line PL, and a second terminal connected to the first node N1. The sixth transistor T6 includes a gate terminal connected to the emission control line EL, a first terminal connected to the third node N3, and a second terminal connected to a pixel electrode of the organic light-emitting diode OLED. The fifth transistor T5 and the sixth transistor T6 may be simultaneously turned on according to the emission control signal En received through the emission control line EL so that a driving current flows through the organic light-emitting diode OLED.

The seventh transistor T7 (second initialization transistor) may be connected between the organic light-emitting diode OLED and the initialization voltage line VIL. The seventh transistor T7 includes a gate terminal connected to the third scan line SL+1, a first terminal connected to the second terminal of the sixth transistor T6 and the pixel electrode of the organic light-emitting diode OLED, and a second terminal connected to the initialization voltage line VIL. The seventh transistor T7 may be turned on according to the third scan signal Sn+1 received through the third scan line SL+1 to initialize a voltage of the pixel electrode of the organic light-emitting diode OLED by transmitting the initialization voltage Vint to the pixel electrode of the organic light-emitting diode OLED. The seventh transistor T7 may be omitted.

The capacitor Cst includes a first electrode connected to the second node N2 and a second electrode connected to the driving voltage line PL. The capacitor Cst may maintain a voltage applied to the gate terminal of the first transistor T1 by storing and maintaining a voltage corresponding to a difference between voltages respectively supplied to both ends of the first electrode and the second electrode.

The organic light-emitting diode OLED may include a pixel electrode (e.g., an anode) and an opposite electrode (e.g., a cathode) facing the pixel electrode, and the opposite electrode may receive the common voltage ELVSS. The organic light-emitting diode OLED may receive a driving current corresponding to a voltage value stored in the capacitor Cst from the first transistor T1 and thus may emit light in a certain color, thereby displaying an image.

Although the transistors of the pixel circuit PC in FIGS. 2A and 2B are P-type transistors, one or more embodiments are not limited thereto. For example, there may be various embodiments, for example, where the transistors of the pixel circuit PC may be N-type transistors, or some may be P-type transistors, and the others may be N-type transistors.

Additionally, embodiments according to the present disclosure are not limited to the components illustrated in FIGS. 2A and 2B, and some embodiments may include additional components or fewer components without departing from the spirit and scope of embodiments according to the present disclosure.

Figure 3:
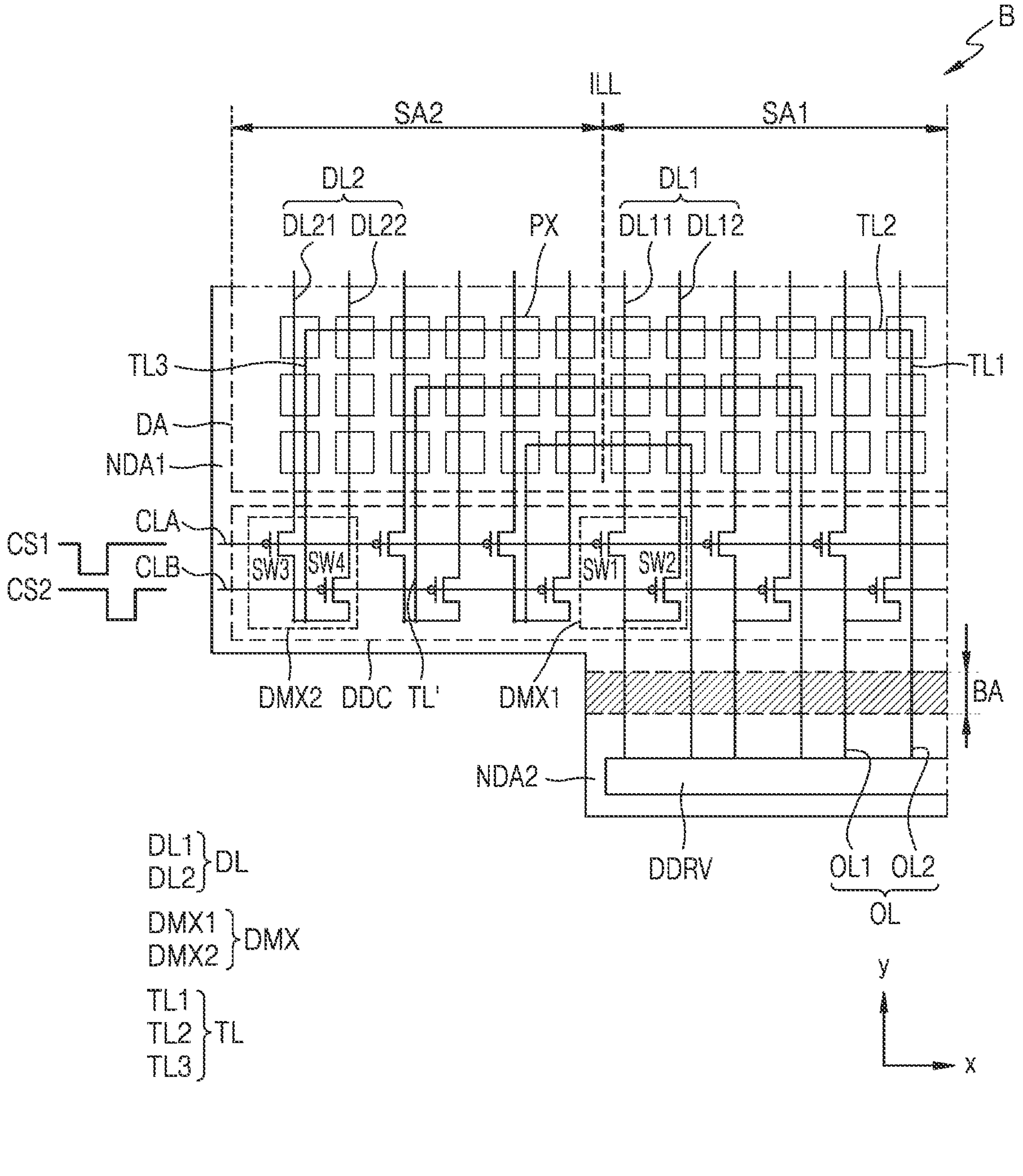
FIGS. 3 and 4 are schematic enlarged views of a region B of FIG. 1 according to some embodiments.
Figure 4:
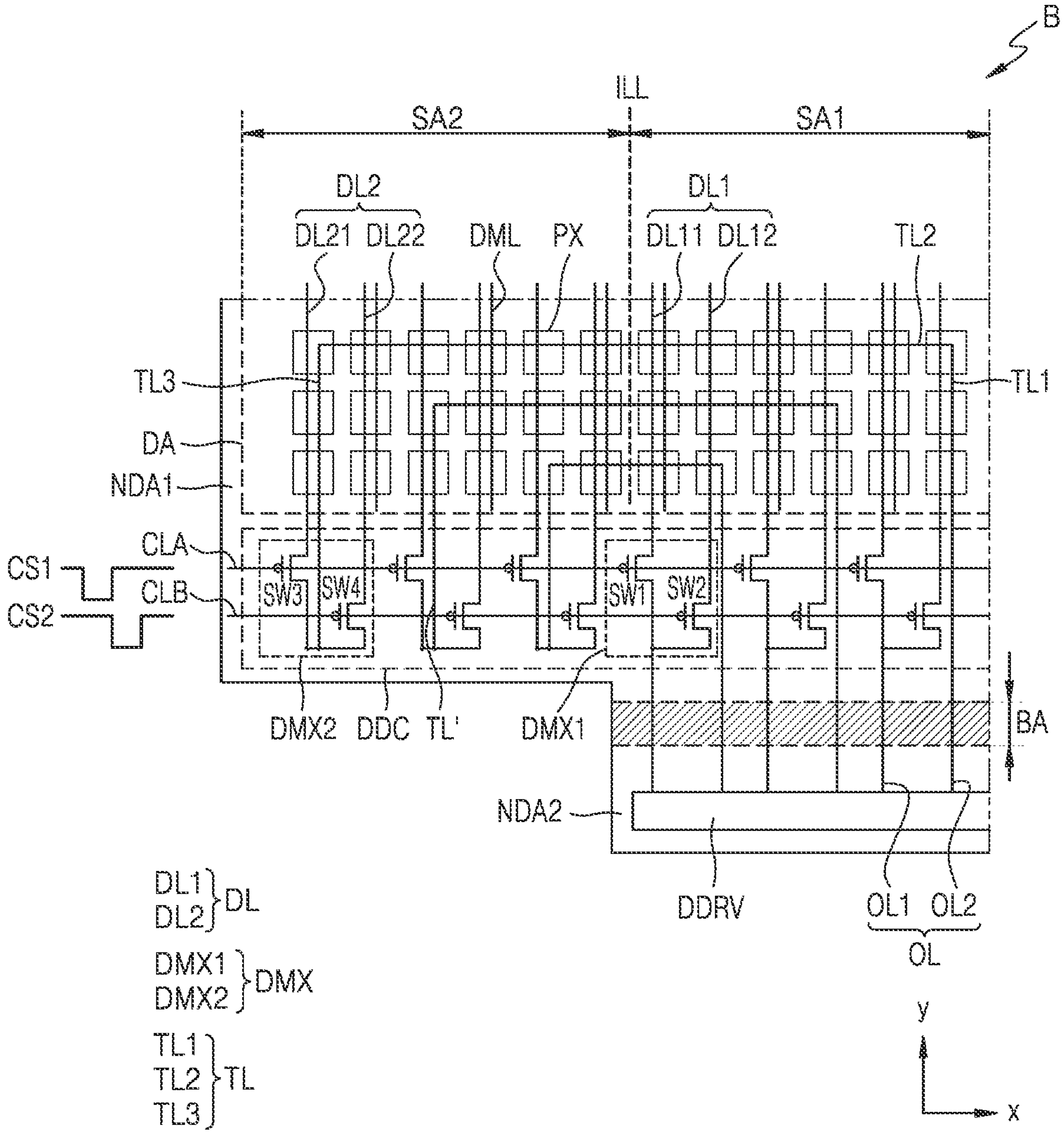

FIGS. 3 and 4 are schematic enlarged views of a region B of FIG. 1 according to some embodiments.

Referring to FIG. 3, the conductive line TL may include a first portion TL1 and a third portion TL3 extending in a second direction and a second portion TL2 extending in a first direction. The second portion TL2 may connect the first portion TL1 and the third portion TL3 to each other. The first portion TL1, the second portion TL2, and the third portion TL3 may be integrally formed with one another. The first portion TL1 may extend in the second direction (a direction +y). The second portion TL2 may be bent from the first portion TL1 to extend in the first direction (a direction +x or a direction −x) and may cross the data lines DL. The third portion TL3 may be bent from the second portion TL2 to extend in the second direction (a direction −y) and may face the first portion TL1. The first portion TL1 of the conductive line TL may be arranged in the first sub-area SA1, and the third portion TL3 may be arranged in the second sub-area SA2.

The data lines DL may include first data lines DL1 arranged in the first sub-area SA1 and second data lines DL2 arranged in the second sub-area SA2. The first portion TL1 of the conductive line TL may be parallel to the first data line DL1, and the third portion TL3 may be parallel to the second data line DL2. The second portion TL2 of each conductive line TL may be parallel to a scan line.

The plurality of demultiplexers DMX may be provided between the data lines DL and output lines OL of the data driving circuit DDRV. The demultiplexers DMX may include first demultiplexers DMX1 connected to the first data lines DL1 and second demultiplexers DMX2 connected to the second data lines DL2. The output lines OL may include first output lines OL1 connected to the first demultiplexers DMX1 and second output lines OL2 connected to the second demultiplexers DMX2. The second output lines OL2 may be electrically connected to the second demultiplexers DMX2, using the conductive lines TL. Each of the second output lines OL2 may be connected to the first portion TL1 of the corresponding conductive line TL and thus may be connected to the corresponding second demultiplexer DMX2.

Each of the first demultiplexers DMX1 may connect one first output line OL1 and two first data lines DL1 to each other. Each of the first demultiplexers DMX1 may be directly connected to the first data lines DL1. Each of the second demultiplexers DMX2 may connect one second output line OL2 and two second data lines DL2 to each other through the conductive line TL. That is, the first portion TL1 of each of the conductive lines TL may be connected to the data driving circuit DDRV through the second output line OL2, and the third portion TL3 may be connected to the second demultiplexer DMX2.

According to some embodiments, the second output line OL2 may be formed by extending the first portion TL1 of the conductive line TL from the display area DA to the peripheral area PA. According to some embodiments, the first portion TL1 of the conductive line TL and the second output line OL2 may be arranged on different layers from each other and may be electrically connected to each other through a contact hole.

According to some embodiments, a conductive line TL' connecting the third portion TL3 of the conductive line TL and the second demultiplexer DMX2 to each other may be integrally formed with the third portion TL3 to extend from the third portion TL3. According to some embodiments, the conductive line TL' may be separately provided on a different layer from the third portion TL3 of the conductive line TL to electrically connect the third portion TL3 and the second demultiplexer DMX2 to each other.

Each of the first demultiplexers DMX1 may be provided between the first output line OL1 and a pair of first data lines DL1 and may include a first switch SW1 and a second switch SW2.

The first switch SW1 may be provided between the first output line OL1 and one first data line DL11 of the pair of first data lines DL1. The first switch SW1 may include a gate terminal connected to a first control line CLA, a first terminal connected to the first output line OL1, and a second terminal connected to the first data line DL11. The first switch SW1 may be turned on according to a first control signal CS1 applied from the first control line CLA to transmit the data signal DATA applied via the first output line OL1 to the first data line DL11.

The second switch SW2 may be provided between the first output line OL1 and the other first data line DL12 of the pair of first data lines DL1. The second switch SW2 may include a gate terminal connected to a second control line CLB, a first terminal connected to the first output line OL1, and a second terminal connected to the first data line DL12. The second switch SW2 may be turned on according to a second control signal CS2 applied from the second control line CLB to transmit the data signal DATA applied via the first output line OL1 to the first data line DL12. A timing at which a gate-on level (e.g., low-level) second control signal CS2 is applied may be different from a timing at which a gate-on level first control signal CS1 is applied, and the first control signal CS1 and the second control signal CS2 may be alternately applied.

Each of the second demultiplexers DMX2 may be provided between the conductive line TL connected to the second output line OL2 and a pair of second data lines DL2 and may include a third switch SW3 and a fourth switch SW4.

The third switch SW3 may be provided between the conductive line TL and one second data line DL21 of a pair of second data lines DL2. The third switch SW3 may include a gate terminal connected to the first control line CLA, a first terminal connected to the conductive line TL, and a second terminal connected to the second data line DL21. The third switch SW3 may be turned on according to the first control signal CS1 applied from the first control line CLA to transmit the data signal DATA applied via the second output line OL2 to the second data line DL21.

The fourth switch SW4 may be provided between the conductive line TL and the other second data line DL22 of the pair of adjacent second data lines DL2. The fourth switch SW4 may include a gate terminal connected to the second control line CLB, a first terminal connected to the conductive line TL, and a second terminal connected to the second data line DL22. The fourth switch SW4 may be turned on according to the second control signal CS2 applied from the second control line CLB to transmit the data signal DATA applied via the second output line OL2 to the second data line DL22.

The first portion TL1 of the conductive line TL may be parallel to the first data line DL12 in the pixel PX where the first data line DL12 connected to a right switch of the first demultiplexer DMX1, for example, the second switch SW2, is arranged. In addition, the third portion TL3 of the conductive line TL may be parallel to the second data line DL21 in the pixel PX where the second data line DL21 connected to a left switch of the second demultiplexer DMX2, for example, the third switch SW3, is arranged.

Although FIG. 3 shows a portion of the first area A1 as an example, this may also be similarly applied to the second area A2. For example, in the second area A2, the first portion TL1 of the conductive line TL may be parallel to the first data line DL11 in the pixel PX where the first data line DL11 connected to a left switch of the first demultiplexer DMX1, for example, the first switch SW1, is arranged. In addition, the third portion TL3 of the conductive line TL may be parallel to the second data line DL22 in the pixel PX where the second data line DL22 connected to a right switch of the second demultiplexer DMX2, for example, the fourth switch SW4, is arranged.

According to some embodiments as illustrated with respect to FIG. 3, a display device may include a 1:2 demultiplexer DMX connecting one output line and two data lines to each other, and a column where the third portion TL3 of the conductive line TL is arranged may be spaced apart from a column where the first portion TL1 is arranged by columns of a multiple of 4 (4k, where k is a natural number). Accordingly, reflection (or scattering) characteristics of light become different between the pixels PX in columns where the first portion TL1 and the third portion TL3 of the conductive line TL are not arranged and the pixels PX in the columns where the first portion TL1 and the third portion TL3 are arranged, and thus, areas may be distinguished from each other.

According to some embodiments, as shown in FIG. 4, a dummy line DML may be further arranged in the display area DA where the conductive lines TL are not arranged. The dummy line DML may be arranged in the columns where the first portion TL1 and the third portion TL3 of the conductive line TL are not arranged. The dummy line DML may correspond to locations of the first portion TL1 and the third portion TL3 of the conductive line TL and may be parallel to the first data line DL1 or the second data line DL2. According to some embodiments as described with respect to FIG. 4, reflection (or scattering) characteristics of light may become similar between the pixels PX in the columns where the first portion TL1 and the third portion TL3 of the conductive line TL are not arranged and the pixels PX in the columns where the first portion TL1 and the third portion TL3 are arranged, and thus, distinguishment between areas may be reduced (or prevented).

Dummy lines DML may receive a constant voltage. For example, the dummy lines DML may receive the driving voltage ELVDD or the common voltage ELVSS. The dummy lines DML may be connected to a driving voltage supply line arranged in the peripheral area NDA to receive the driving voltage ELVDD. Alternatively, the dummy lines DML may be connected to a common voltage supply line arranged in the peripheral area NDA to receive the common voltage ELVSS.

Figure 5:
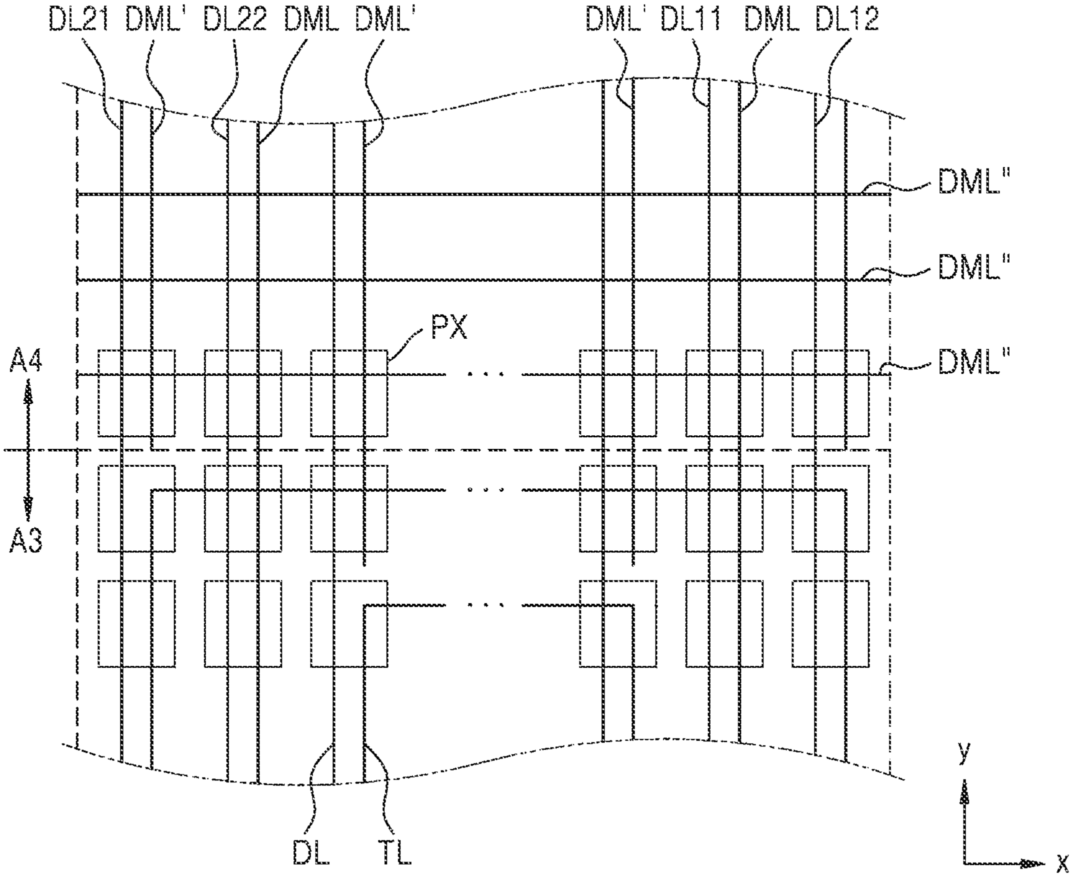
FIG. 5 is a schematic enlarged view of a portion of FIG. 1 according to some embodiments.

FIG. 5 is a schematic enlarged view of a portion of FIG. 1 according to some embodiments.

As shown in FIG. 5, dummy lines DML, DML', and DML" may be further arranged in the display area DA. The dummy lines DML, DML', and DML" may be connected to a driving voltage supply line or a common voltage supply line arranged in the first non-display area NDA1 to receive the driving voltage ELVDD or the common voltage ELVSS.

As shown in FIG. 4, the dummy lines DML may be arranged in columns except the columns where the first portion TL1 and the third portion TL3 of the conductive line TL are at least partially arranged. In correspondence with locations where the first portion TL1 and the third portion TL3 of the conductive line TL are arranged, the dummy lines DML may be arranged in the third area A3 and the fourth area A4 of the display area DA to extend in a second direction.

In the columns where the first portion TL1 and the third portion TL3 of the conductive line TL are at least partially arranged, the dummy lines DML' may be arranged in areas where the first portion TL1 and the third portion TL3 of the conductive line TL are not arranged. The dummy lines DML' may be arranged in the third area A3 and the fourth area A4 of the display area DA to extend in the second direction.

The dummy lines DML" may extend in a first direction for each row in the fourth area A4 of the display area DA and may be parallel to the scan line SL. In each row of the fourth area A4, the dummy lines DML" may correspond to locations where the second portion TL2 of the conductive line TL is arranged.

Figure 6:
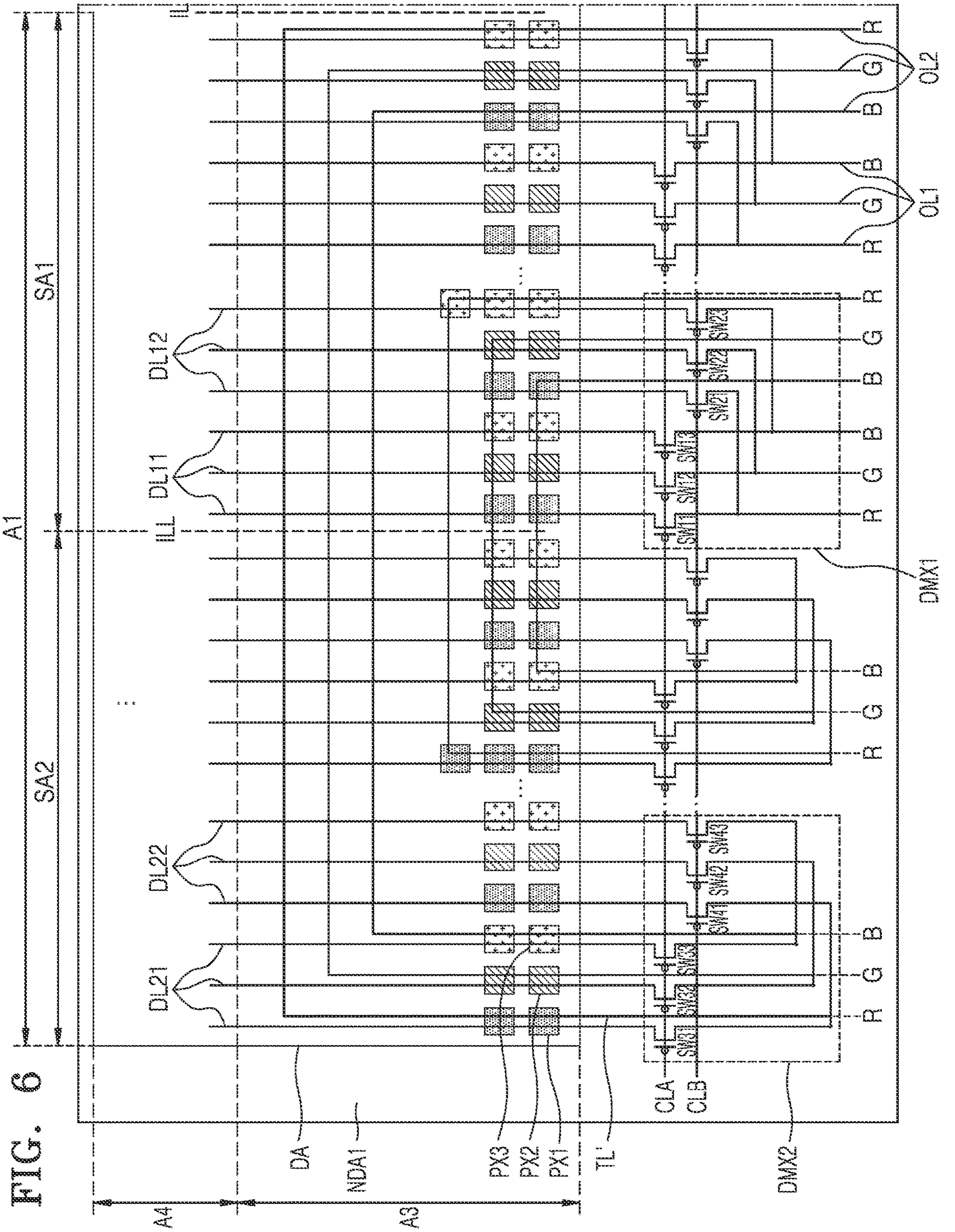
FIGS. 6 and 9 are schematic enlarged views of a portion of a first area of FIG. 1 according to some embodiments.
Figure 7:
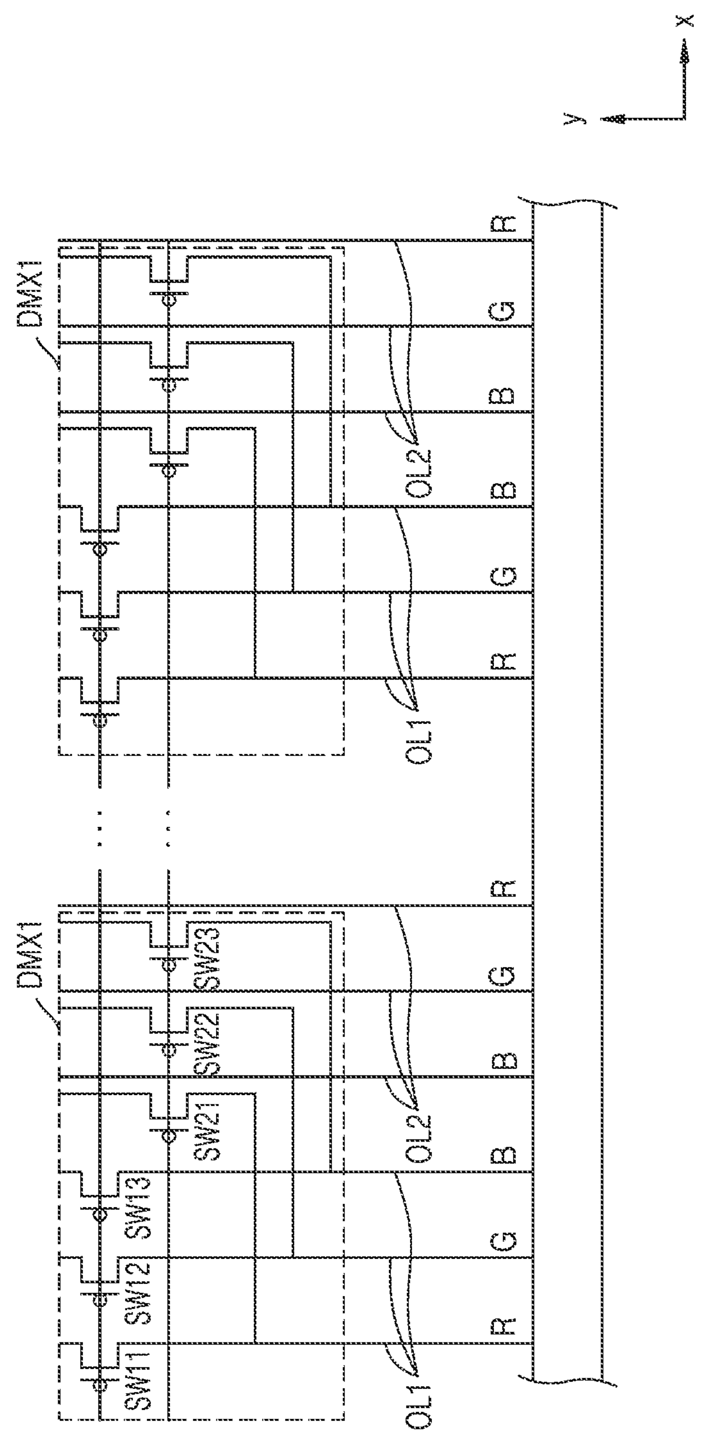
FIG. 7 is a schematic diagram of a first demultiplexer corresponding to a first area of FIG. 1 according to some embodiments.
Figure 8:
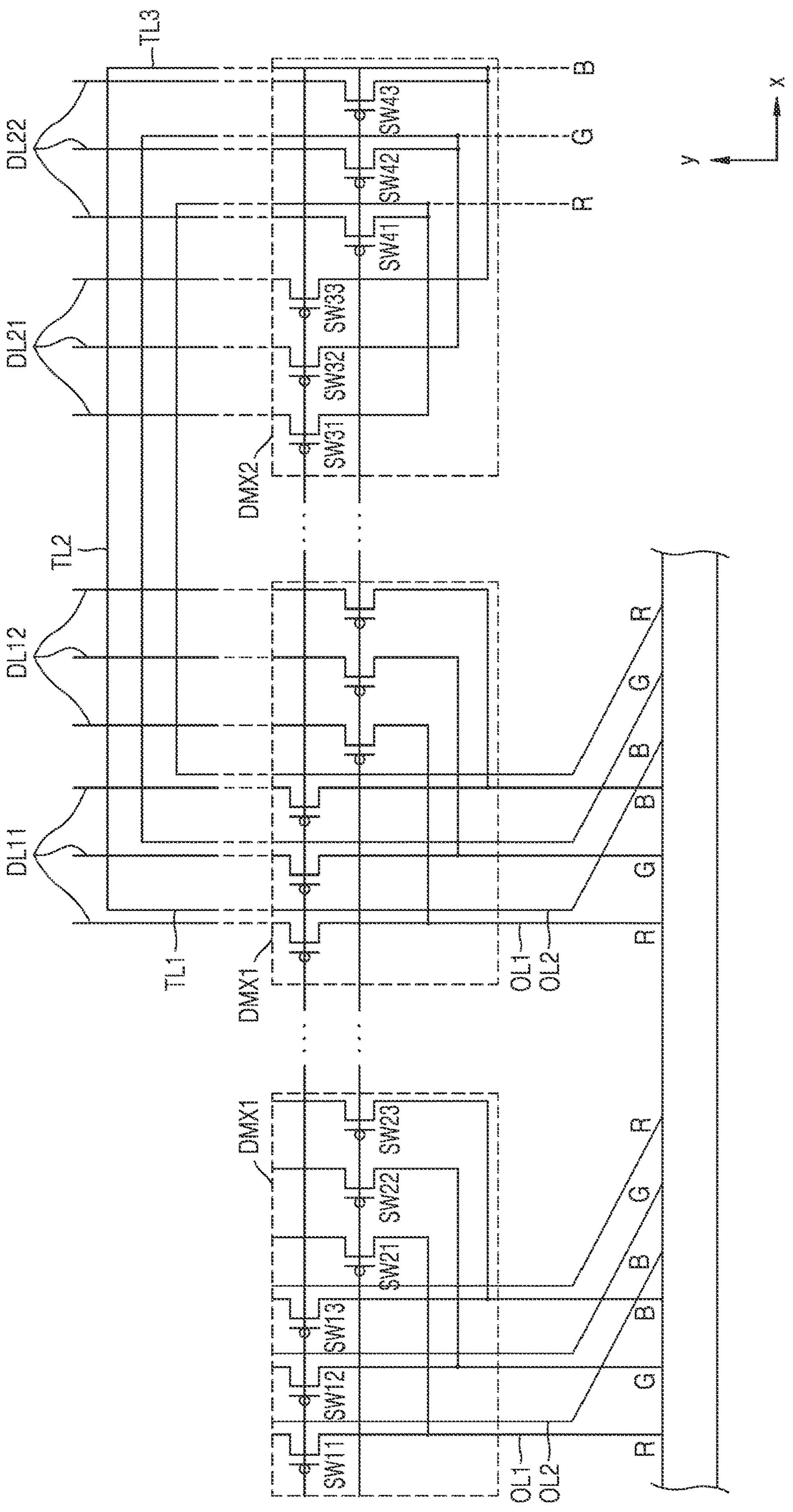
FIG. 8 is a schematic diagram of a first demultiplexer and a second demultiplexer corresponding to a second area of FIG. 1 according to some embodiments.
Figure 9:
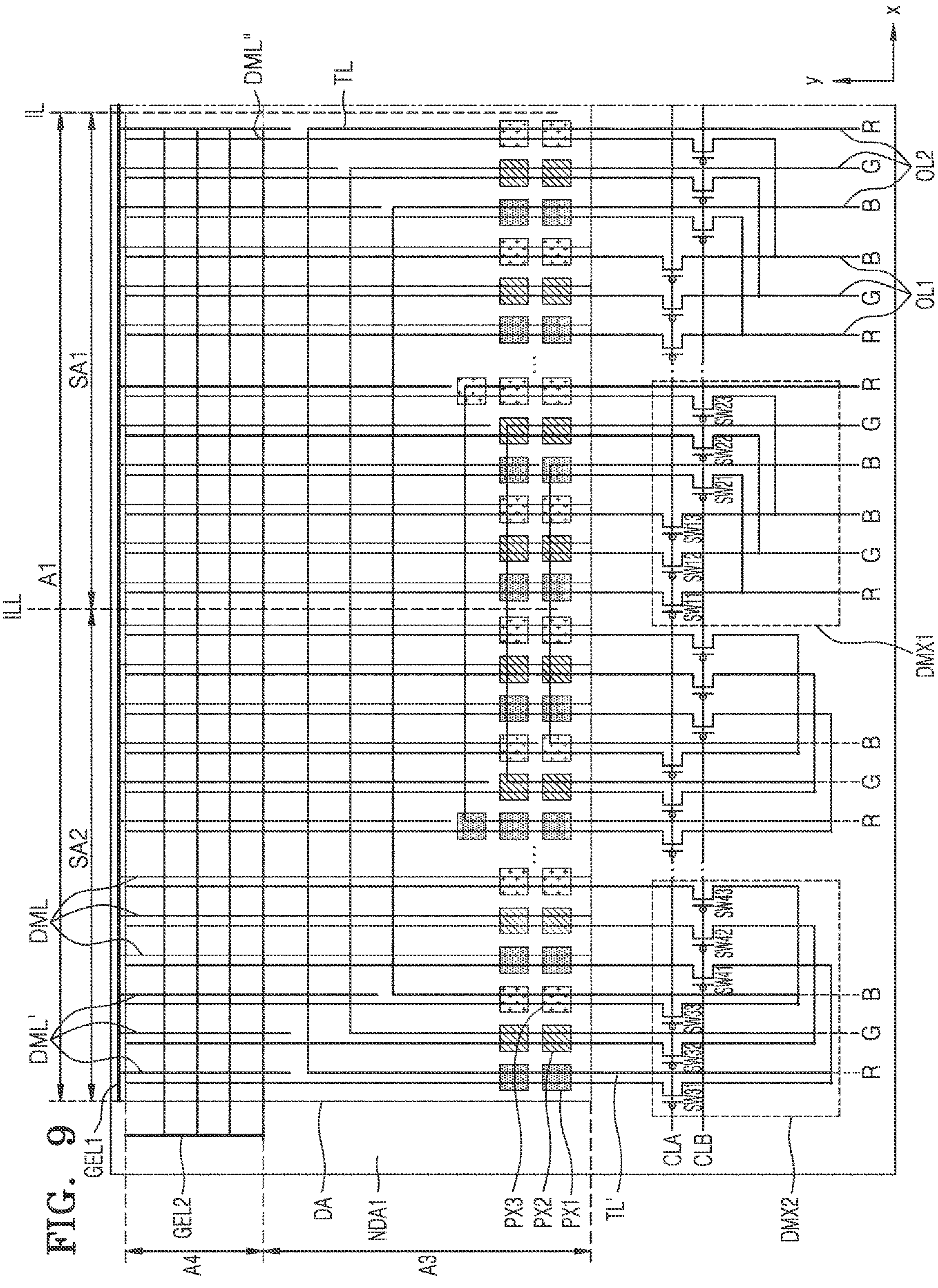

FIGS. 6 and 9 are schematic enlarged views of a portion of the first area A1 of FIG. 1 according to some embodiments. FIG. 7 is a schematic diagram of the first demultiplexer DMX1 corresponding to the first area A1 of FIG. 1 according to some embodiments. FIG. 8 is a schematic diagram of the first demultiplexer DMX1 and the second demultiplexer DMX2 corresponding to the second area A2 of FIG. 1 according to some embodiments. Hereinafter, configurations different from those of the embodiments shown in FIGS. 3 to 5 will be mainly described.

Referring to FIG. 6, the pixels PX arranged in the display area DA may include a plurality of first pixels PX1 displaying a first color, a plurality of second pixels PX2 displaying a second color, and a plurality of third pixels PX3 displaying a third color. According to some embodiments, the first pixel PX1 may be a red pixel, the second pixel PX2 may be a green pixel, and the third pixel PX3 may be a blue pixel.

FIG. 6 shows a stripe pixel arrangement according to some embodiments. For example, the first pixels PX1 may be repeatedly arranged in a first column, the second pixels PX2 may be repeatedly arranged in a second column adjacent to the first column, and the third pixels PX3 may be repeatedly arranged in a third column adjacent to the second column. When the three first to third pixels PX1 to PX3 are referred to as a unit pixel, unit pixels may be repeatedly arranged in a first direction.

For example, 630 unit pixels may be repeatedly arranged in the first direction in each of the first sub-area SA1 and the second sub-area SA2, and thus, in each of the first area A1 and the second area A2, 1080 pixels may be arranged in a second direction for each column, and 3780 pixels may be arranged in the first direction for each row. Accordingly, 1890 data lines may be arranged in each of the first sub-area SA1 and the second sub-area SA2, and thus, first to 3780th data lines may be arranged in each of the first area A1 and the second area A2. In addition, first to 945th conductive lines TL may be arranged in each of the first area A1 and the second area A2. The number of conductive lines TL may be less than the number of pixels arranged in the second direction.

Each of the first demultiplexers DMX1 corresponding to the first sub-area SA1 of each of the first area A1 and the second area A2 may include three first sub-demultiplexers. Each of the first sub-demultiplexers may connect one first output line OL1 and two first data lines DL1 to each other. The first sub-demultiplexers may include a 1-1 sub-demultiplexer, a 1-2 sub-demultiplexer and a 1-3 sub-demultiplexer. The 1-1 sub-demultiplexer may connect the first output line OL1 configured to output a red data signal R and the first data lines DL11 and DL12 of a pair of red pixel columns configured to receive the red data signal R to each other. The 1-2 sub-demultiplexer may connect the first output line OL1 configured to output a green data signal G and the first data lines DL11 and DL12 of a pair of green pixel columns configured to receive the green data signal G to each other. The 1-3 sub-demultiplexer may connect the first output line OL1 configured to output a blue data signal B and the first data lines DL11 and DL12 of a pair of blue pixel columns configured to receive the blue data signal B to each other.

The 1-1 sub-demultiplexer may include a first switch SW11 and a second switch SW21. The first switch SW11 may be provided between the first output line OL1 and one first data line DL11 of first data lines DL1 of a pair of red pixel columns. The second switch SW21 may be provided between the first output line OL1 and the other first data line DL12 of the first data lines DL1 of the pair of red pixel columns.

The 1-2 sub-demultiplexer may include a first switch SW12 and a second switch SW22. The first switch SW12 may be provided between the first output line OL1 and one first data line DL11 of first data lines DL1 of a pair of green pixel columns. The second switch SW22 may be provided between the first output line OL1 and the other first data line DL12 of the first data lines DL1 of the pair of green pixel columns.

The 1-3 sub-demultiplexer may include a first switch SW13 and a second switch SW23. The first switch SW13 may be provided between the first output line OL1 and one first data line DL11 of first data lines DL1 of a pair of blue pixel columns. The second switch SW23 may be provided between the first output line OL1 and the other first data line DL12 of the first data lines DL1 of the pair of blue pixel columns.

Each of the first switches SW11, SW12, and SW13 may include a gate terminal connected to the first control line CLA, a first terminal connected to the first output line OL1, and a second terminal connected to the first data line DL11. Each of the first switches SW11, SW12, and SW13 may be turned on according to the first control signal CS1 applied from the first control line CLA to apply the data signals R, G, and B applied via the first output line OL1 to the first data line DL11.

Each of the second switches SW21, SW22, and SW23 may include a gate terminal connected to the second control line CLB, a first terminal connected to the first output line OL1, and a second terminal connected to the first data line DL12. Each of the second switches SW21, SW22, and SW23 may be turned on according to the second control signal CS2 applied from the second control line CLB to apply the data signals R, G, and B applied via the first output line OL1 to the first data line DL12.

Each of the second demultiplexers DMX2 corresponding to the second sub-area SA2 of each of the first area A1 and the second area A2 may include three second sub-demultiplexers. Each of the second sub-demultiplexers may connect one second output line OL2 and two second data lines DL2 to each other through the conductive line TL. The second sub-demultiplexers may include a 2-1 sub-demultiplexer, a 2-2 sub-demultiplexer and a 2-3 sub-demultiplexer. The 2-1 sub-demultiplexer may connect the conductive line TL connected to the second output line OL2 configured to output the red data signal R and the second data lines DL21 and DL22 of a pair of red pixel columns to each other. The 2-2 sub-demultiplexer may connect the conductive line TL connected to the second output line OL2 configured to output the green data signal G and the second data lines DL21 and DL22 of a pair of green pixel columns to each other. The 2-3 sub-demultiplexer may connect the conductive line TL connected to the second output line OL2 configured to output the blue data signal B and the second data lines DL21 and DL22 of a pair of blue pixel columns to each other.

The 2-1 sub-demultiplexer may include a third switch SW31 and a fourth switch SW41. The third switch SW31 may be provided between the conductive line TL and one second data line DL21 of second data lines DL2 of a pair of red pixel columns. The fourth switch SW41 may be provided between the conductive line TL and the other second data line DL22 of the second data lines DL2 of the pair of red pixel columns.

The 2-2 sub-demultiplexer may include a third switch SW32 and a fourth switch SW42. The third switch SW32 may be provided between the conductive line TL and one second data line DL21 of second data lines DL2 of a pair of green pixel columns. The fourth switch SW42 may be provided between the conductive line TL and the other second data line DL22 of the second data lines DL2 of the pair of green pixel columns.

The 2-3 sub-demultiplexer may include a third switch SW33 and a fourth switch SW43. The third switch SW33 may be provided between the conductive line TL and one second data line DL21 of second data lines DL2 of a pair of blue pixel columns. The fourth switch SW43 may be provided between the conductive line TL and the other second data line DL22 of the second data lines DL2 of the pair of blue pixel columns.

Each of the third switches SW31, SW32, and SW33 may include a gate terminal connected to the first control line CLA, a first terminal connected to the conductive line TL, and a second terminal connected to the second data line DL21. Each of the third switches SW31, SW32, and SW33 may be turned on according to the first control signal CS1 applied from the first control line CLA to apply the data signals R, G, and B applied via the second output line OL2 to the second data line DL21.

Each of the fourth switches SW41, SW42, and SW43 may include a gate terminal connected to the second control line CLB, a first terminal connected to the conductive line TL, and a second terminal connected to the second data line DL22. Each of the fourth switches SW41, SW42, and SW43 may be turned on according to the second control signal CS2 applied from the second control line CLB to apply the data signals R, G, and B applied via the second output line OL2 to the second data line DL22.

In the first area A1, first portions TL1 of the conductive lines TL may be parallel to the first data lines DL12 in the pixels PX where the first data lines DL12 connected to right switches of the first demultiplexer DMX1, for example, the second switches SW21, SW22, and SW23, are arranged. In addition, third portions TL3 of the conductive lines TL may be parallel to the second data lines DL21 in the pixels PX where the second data lines DL21 connected to left switches of the second demultiplexer DMX2, for example, the third switches SW31, SW32, and SW33, are arranged.

According to some embodiments, in the second area A2, the first portions TL1 of the conductive lines TL may be parallel to the first data lines DL11 in the pixels PX where the first data lines DL11 connected to left switches of the first demultiplexer DMX1, for example, the first switches SW11, SW12, and SW13, are arranged. In addition, the third portions TL3 of the conductive lines TL may be parallel to the second data lines DL22 in the pixels PX where the second data lines DL22 connected to right switches of the second demultiplexer DMX2, for example, the fourth switches SW41, SW42, and SW43, are arranged.

Referring to FIGS. 7 and 8, the output lines OL of the data driving circuit DDRV may have three first output lines OL1 and three second output lines OL2 alternately arranged in a first direction from a left side of the substrate 100. The data driving circuit DDRV may output first to third color data signals RGB via the three first output lines OL1 in the order in which the first to third pixels PX1 to PX3 are arranged in the first direction, that is, an arrangement order of the first data lines DL1 of the first to third columns. The data driving circuit DDRV may output the first to third color data signals RGB via the three second output lines OL2 in a reverse order of an arrangement of the second data lines DL2 of the first to third columns. Accordingly, data signals applied via the three first output lines OL1 and the three second output lines OL2 may be in the order of RGB/BGR/RGB/BGR . . . in the first direction from a left side of the substrate 100

As the data driving circuit DDRV changes an order of data signals output via the second output lines OL2 to the reverse of an order of data signals output via the first output lines OL1, an arrangement structure of the conductive lines TL may be simplified, and thus, a non-display area (dead space) of a display device may be reduced, and line resistance may be reduced.

In FIG. 6, the conductive lines TL are arranged between the first switches SW11, SW12, and SW13 of the first demultiplexers DMX1 and between the fourth switches SW41, SW42, and SW43 of the second demultiplexers DMX2 in the first area A1, and are arranged between the second switches SW21, SW22, and SW23 of the first demultiplexers DMX1 and between the third switches SW31, SW32, and SW33 of the second demultiplexers DMX2 in the second area A2. Accordingly, columns where the conductive lines TL are arranged and columns where the conductive lines TL are not arranged may alternate with each other.

As shown in FIG. 9, the dummy lines DML, DML', and DML" may be further arranged in the display area DA. The dummy lines DML, DML', and DML" may be connected to driving voltage supply lines GEL1 and GEL2 or a common voltage supply line arranged in the first non-display area NDA1 to receive the driving voltage ELVDD or the common voltage ELVSS.

The dummy lines DML may be arranged in columns except the columns where the first portion TL1 and the third portion TL3 of the conductive line TL are at least partially arranged. In correspondence with locations where the first portion TL1 and the third portion TL3 of the conductive line TL are arranged, the dummy lines DML may be arranged in the third area A3 and the fourth area A4 of the display area DA to extend in a second direction.

In the columns where the first portion TL1 and the third portion TL3 of the conductive line TL are at least partially arranged, the dummy lines DML' may be arranged in areas where the first portion TL1 and the third portion TL3 of the conductive line TL are not arranged. The dummy lines DML' may be arranged in the third area A3 and the fourth area A4 of the display area DA to extend in the second direction.

The dummy lines DML" may extend in a first direction for each row in the fourth area A4 of the display area DA and may be parallel to a scan line. In each row of the fourth area A4, the dummy lines DML" may correspond to locations where the second portion TL2 of the conductive line TL is arranged.

In some embodiments, as illustrated with respect to FIG. 9, three dummy lines DML and three dummy lines DML' may be alternately arranged in each of a left direction and a right direction of the left imaginary line ILL in the first area A1. The dummy lines DML, DML', and DML" may be substantially symmetrical with respect to the left imaginary line ILL. According to some embodiments, like that shown in FIG. 9, three dummy lines DML and three dummy lines DML' may be alternately arranged in each of a left direction and a right direction of the right imaginary line ILR in the second area A2. The dummy lines DML, DML', and DML" may be substantially symmetrical with respect to the right imaginary line ILR.

Figure 10A:
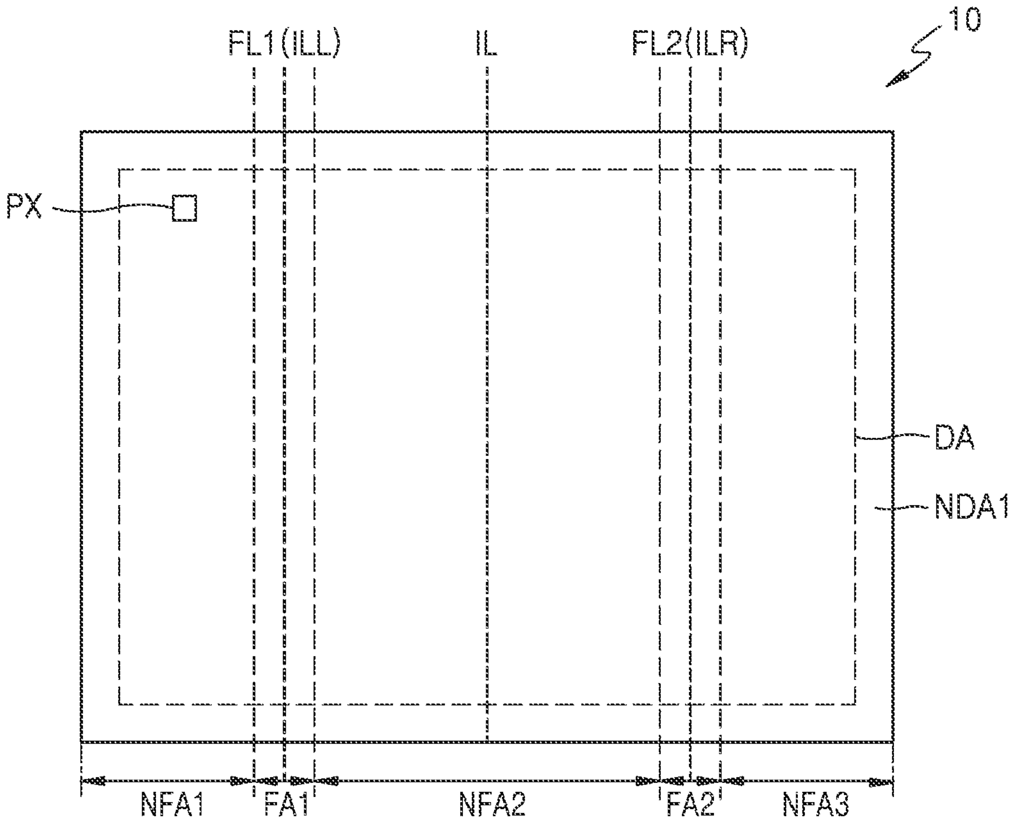
FIGS. 10A and 10B are schematic plan views of a display device before being folded according to some embodiments.
Figure 10B:
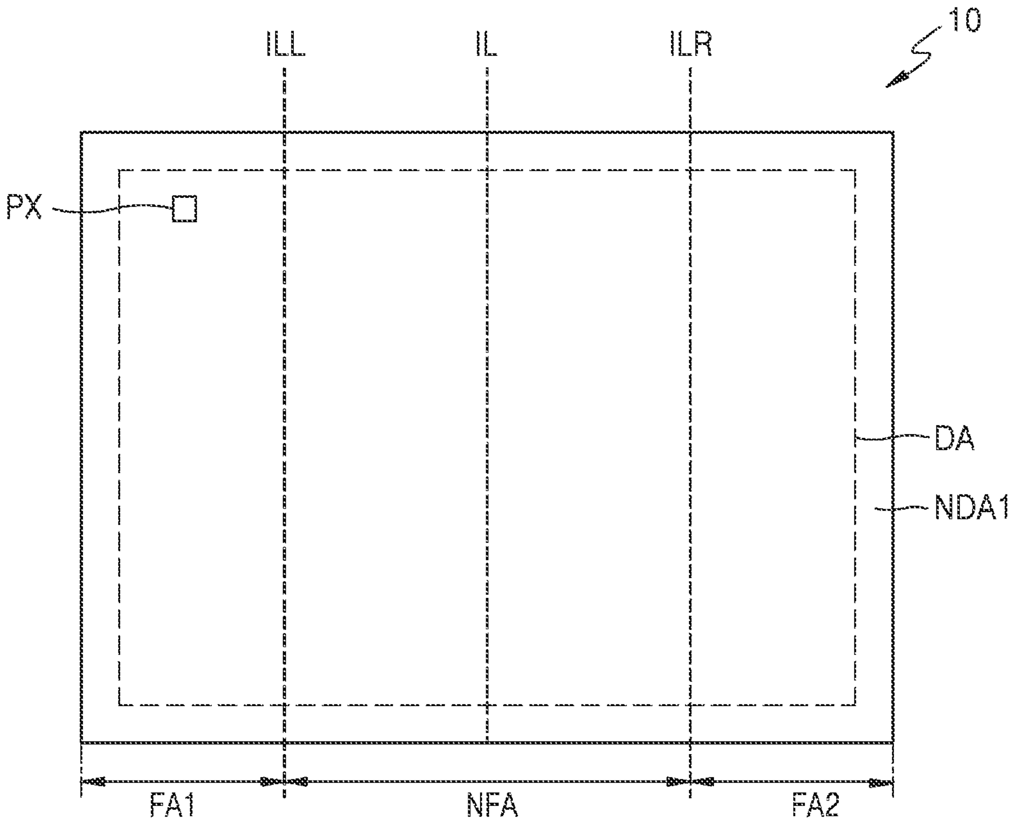
Figure 11A:
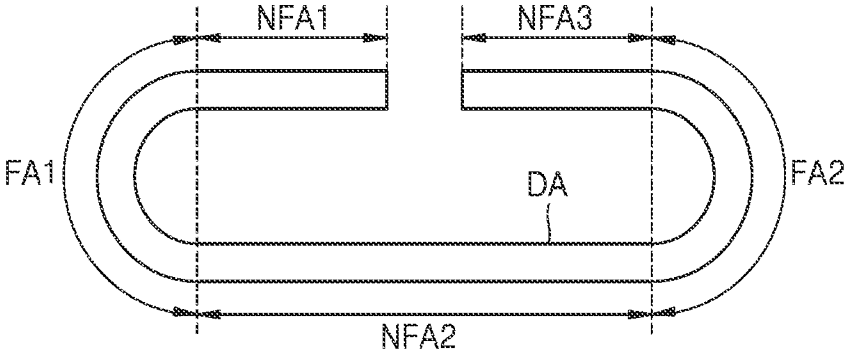
FIGS. 11A and 11B are schematic cross-sectional views of a display device in a folded state according to some embodiments.
Figure 11B:
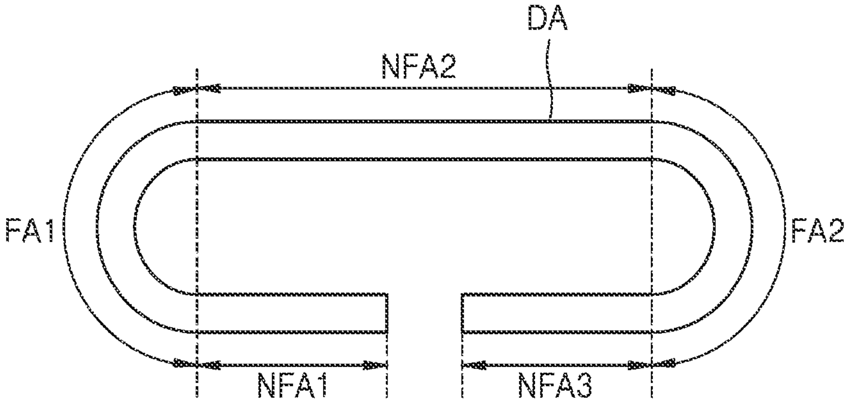

FIGS. 10A and 10B are schematic plan views of a display device before being folded according to some embodiments. FIGS. 11A and 11B are schematic cross-sectional views of a display device in a folded state according to some embodiments. The display device according to some embodiments may include the display panel 10 of FIG. 1.

The display device according to some embodiments may be implemented as an electronic device such as a smartphone, a mobile phone, a smart watch, a navigation device, a game console, a television (TV), an automotive head unit, a notebook computer, a laptop computer, a tablet computer, a personal media player (PMP), a personal digital assistant (PDA), or any other suitable electronic device. The display device according to some embodiments may be a foldable or bendable display device.

Referring to FIG. 10A, the display panel 10 may be at least partially flexible and may be folded at the flexible portion. That is, the display panel 10 may include folding areas FA1 and FA2, which are flexible and foldable, and non-folding areas NFA1, NFA2, and NFA3, which are provided on at least one side of the folding areas FA1 and FA2 and are not folded. In this regard, although an area that is not folded is referred to as a non-folding area, this is for convenience of description, and the expression "non-folding" covers not only a case of being rigid due to lack of flexibility but also a case of being flexible but less flexible than the folding areas FA1 and FA2 and a case of being flexible but not being folded. The display panel 10 may display images in the display area DA of the folding areas FA1 and FA2 and the non-folding areas NFA1, NFA2, and NFA3.

According to some embodiments, as shown in FIG. 10A, the two folding areas FA1 and FA2 may be provided on the display panel 10, and the plurality of non-folding areas NFA1, NFA2, and NFA3 may be spaced apart from one another with the folding areas FA1 and FA2 therebetween. Each folding area FA1 and FA2 may be folded based on folding lines FL1 and FL2. The folding lines FL1 and FL2 may be provided in the folding areas FA1 and FA2 in a second direction in which the folding areas FA1 and FA2 extend, and accordingly, the display device may be folded at the folding areas FA1 and FA2.

Although FIG. 10A shows that the folding lines FL1 and FL2 pass through centers of the folding areas FA1 and FA2 and the folding areas FA1 and FA2 are line-symmetric with respect to the folding lines FL1 and FL2, the disclosure is not limited thereto. That is, the folding lines FL1 and FL2 may be asymmetrically provided in the folding areas FA1 and FA2. The folding areas FA1 and FA2 and the folding lines FL1 and FL2 may overlap an image display area of the display panel 10, and when the display panel 10 is folded, a portion displaying an image may be folded. In FIG. 10A, the left and right folding lines FL1 and FL2 may coincide with the left and right imaginary lines ILL and ILR, respectively, shown in FIG. 1.

According to some embodiments, the display panel 10 may entirely correspond to a folding area. For example, in a display device that is rolled like a scroll, the display panel 10 may entirely correspond to a folding area. Additionally, according to some embodiments, the display panel 10 may include additional folding areas or fewer folding areas without departing from the spirit and scope of embodiments according to the present disclosure.

According to some embodiments, as shown in FIG. 10B, the plurality of folding areas FA1 and FA2 may be provided on the display panel 10 to be spaced apart from each other on the left and right with a non-folding area NFA therebetween. The folding areas FA1 and FA2 shown in FIG. 10B may be divided by the left and right imaginary lines ILL and ILR shown in FIG. 1. In this regard, the folding areas FA1 and FA2 may be folded in a slide manner. In this case, locations of folding lines in the folding areas FA1 and FA2 may be moved in a direction opposite to a slide direction.

As shown in FIGS. 10A and 10B, the display panel 10 may be spread flat as a whole. According to some embodiments, as shown in FIG. 11A, the display panel 10 may be folded so that display surfaces face each other based on the folding lines. According to some embodiments, as shown in FIG. 11B, the display panel 10 may be folded so that display surfaces face the outside based on the folding lines. In this regard, the "display surface" is a surface on which an image is displayed, and the display surface includes the display area DA and the peripheral area PA. In this regard, the term "folded" means that a shape is not fixed but may be modified from an original shape to another shape, and being folded along one or more certain lines, that is, folding lines, being curved, and being rolled like a scroll. Although FIGS. 11A and 11B show that surfaces of the non-folding areas NFA1, NFA2, and NFA3 are parallel to each other and are folded to face each other, the disclosure is not limited thereto, and surfaces of two non-folding areas may be folded to have a certain angle (e.g., an acute angle, a right angle, or an obtuse angle) with a folding area therebetween.

Figure 12:
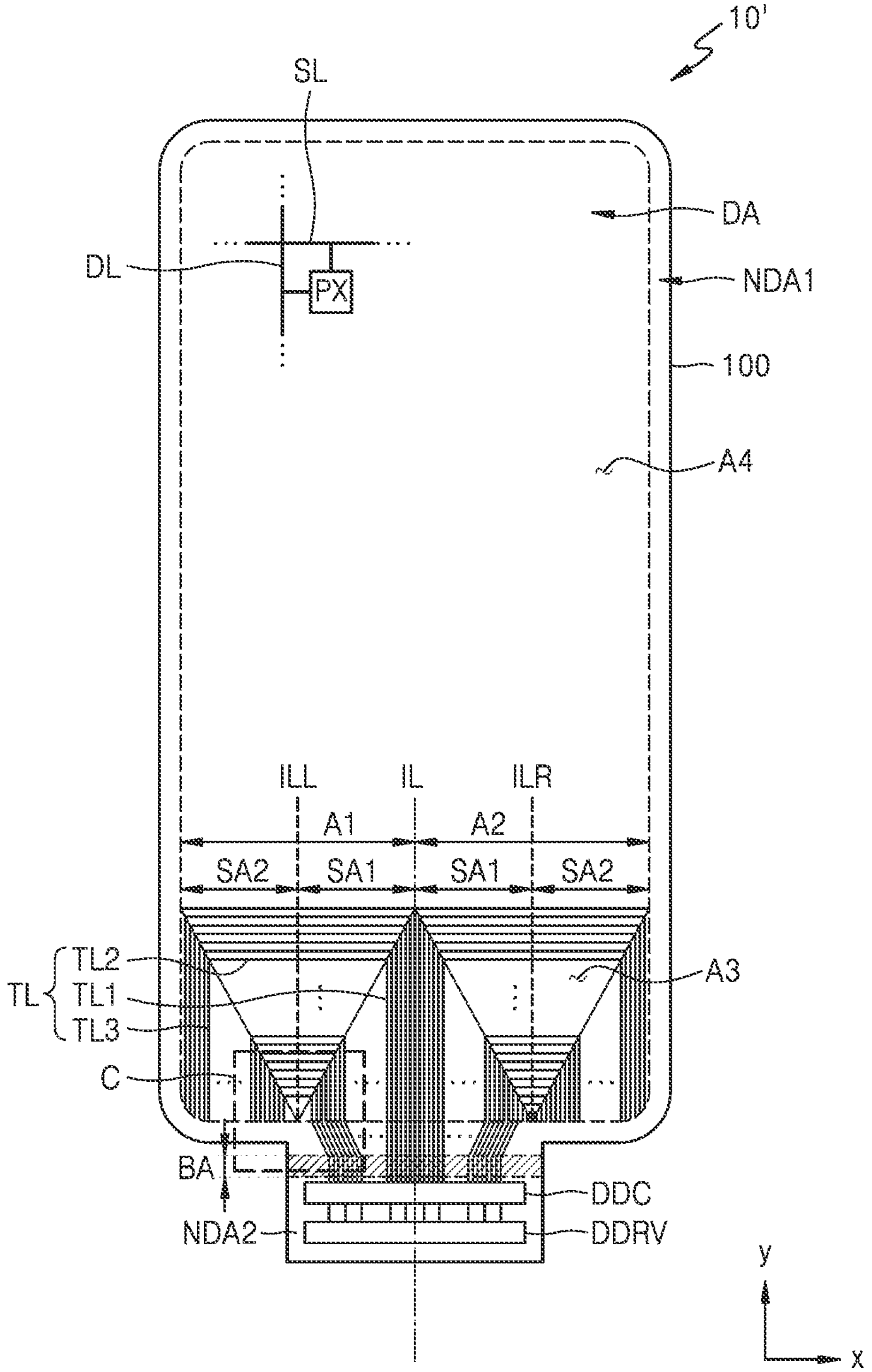
FIG. 12 is a schematic plan view of a display panel according to some embodiments.
Figure 13:
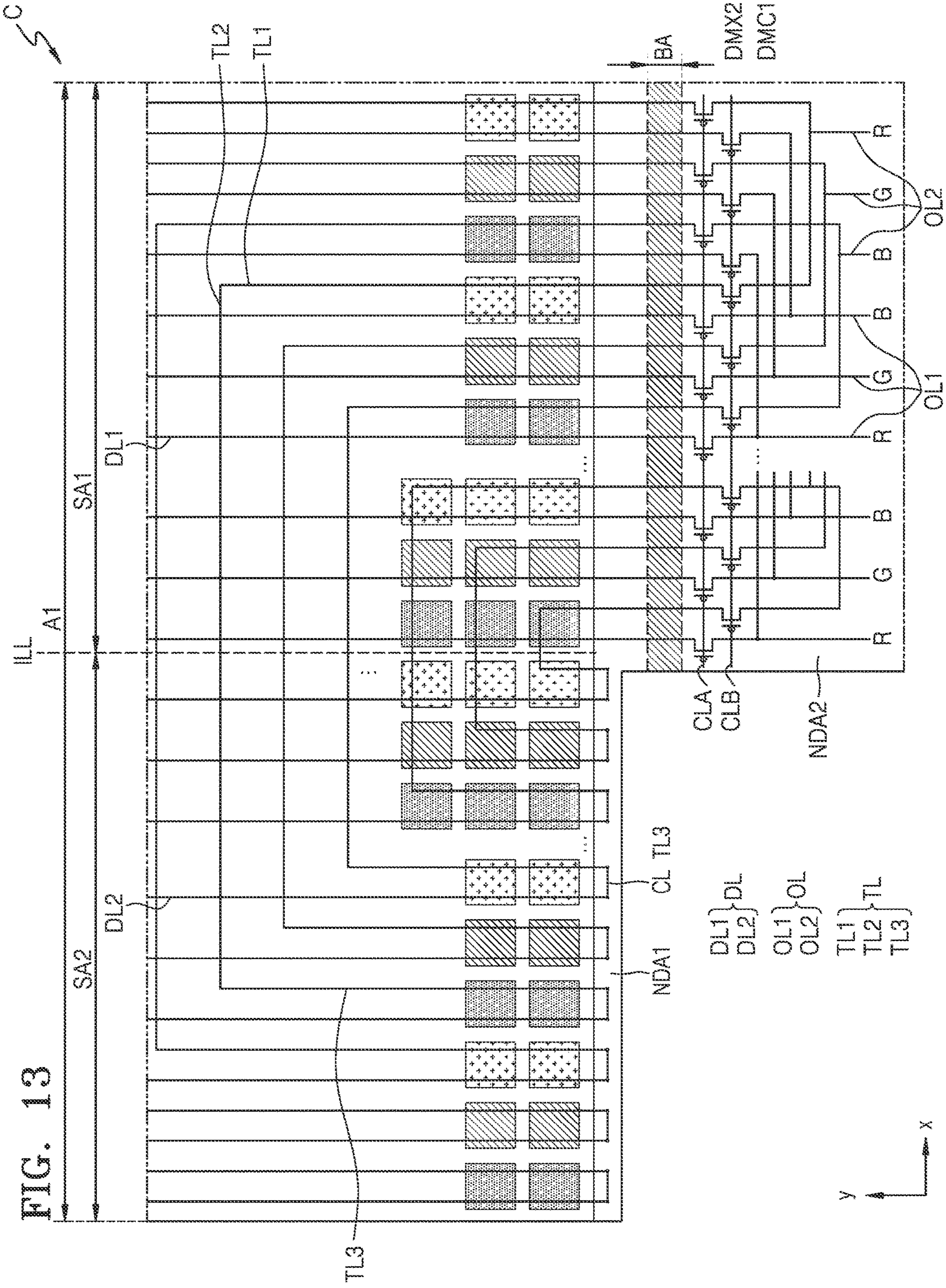
FIG. 13 is a schematic enlarged view of a region C of FIG. 12.

FIG. 12 is a schematic plan view of a display panel 10' according to some embodiments. FIG. 13 is a schematic enlarged view of a region C of FIG. 12.

Unlike the display panel 10 shown in FIG. 1, in the display panel 10' shown in FIG. 12, a first direction (the direction x) is an extension direction of short sides, and a second direction (the direction y) is an extension direction of long sides. In addition, in the display panel 10 shown in FIG. 1, the data distribution circuit DDC is in the first non-display area NDA1 and between the display area DA and the bending area BA, whereas, in the display panel 10' shown in FIG. 12, the data distribution circuit DDC may be in the second non-display area NDA2 and may be between the bending area BA and the data driving circuit DDRV. A detailed description of the same configurations as those of the embodiments described with respect to FIG. 1 may be omitted below, and differences are mainly described.

In the display area DA of the display panel 10', a length in the first direction may be less than a length in the second direction. For example, in the display area DA, m pixels PX may be arranged in the first direction, and n pixels PX may be arranged in the second direction, and in this regard, m may be a natural number less than n. As shown in FIG. 2A or FIG. 2B, each of the plurality of pixels PX may include the organic light-emitting diode OLED as a display element, and the display element may be connected to the pixel circuit PC for driving the display element.

The display area DA may be divided into the first area A1 on the left and the second area A2 on the right, based on the imaginary line IL. The first area A1 and the second area A2 may each include the first sub-area SA1 and the second sub-area SA2, based on the left imaginary line ILL and the right imaginary line ILR.

Signal lines configured to apply an electrical signal to the plurality of pixels PX, for example, the plurality of scan signals SL extending in the first direction, the plurality of data lines DL extending in the second direction, etc. may be arranged in the display area DA.

A scan driving circuit for driving a pixel circuit, the data distribution circuit DDC, and the data driving circuit DDRV may be arranged in the peripheral area PA. The scan driving circuit may be arranged in the first non-display area NDA1, and the data distribution circuit DDC, and the data driving circuit DDRV may be arranged in the second non-display area NDA2.

The conductive lines TL for transmitting a data signal supplied from the data driving circuit DDRV to some data lines DL connected to the pixels PX may be further arranged in the display area DA. The display area DA may be divided into the third area A3 in which the conductive lines TL are arranged and the fourth area A4 in which the conductive lines TL are not arranged. The conductive lines TL arranged on a left side of the imaginary line IL passing through substantially a center of the substrate 100 in the first direction and the conductive lines TL arranged on a right side of the imaginary line IL may be substantially and horizontally symmetrical with respect to the imaginary line IL.

The second non-display area NDA2 may include the bending area BA. The bending area BA may be between the display area DA and the data distribution circuit DDC, and the data distribution circuit DDC may be between the bending area BA and the data driving circuit DDRV. The data distribution circuit DDC may transmit a data signal received from the data driving circuit DDRV to each pixel PX through the data line DL.

Referring to FIG. 13 together, the plurality of first pixels PX1, the plurality of second pixels PX2, and the plurality of third pixels PX3 may be arranged in stripes in the display area DA. In the first area A1 and the second area A2, the first data lines DL1 and the first portions TL1 of the conductive lines TL may be arranged in the first sub-area SA1, and the second data lines DL2 and the third portions TL3 of the conductive lines TL may be arranged in the second sub-area SA2.

The data distribution circuit DDC may include a plurality of first demultiplexers and a plurality of second demultiplexers.

Each of the first demultiplexers may include three first sub-demultiplexers. Each of the first sub-demultiplexers may connect one first output line OL1 and two first data lines DL1 to each other. The first sub-demultiplexers may include a 1-1 sub-demultiplexer, a 1-2 sub-demultiplexer and a 1-3 sub-demultiplexer. The 1-1 sub-demultiplexer may connect the first output line OL1 configured to output the red data signal R and first data lines of a pair of red pixel columns to each other. The 1-2 sub-demultiplexer may connect the first output line OL1 configured to output the green data signal G and first data lines of a pair of green pixel columns to each other. The 1-3 sub-demultiplexer may connect the first output line OL1 configured to output the blue data signal B and first data lines of a pair of blue pixel columns to each other. The 1-1 sub-demultiplexer may include the first switch SW11 and the second switch SW21. The 1-2 sub-demultiplexer may include the first switch SW12 and the second switch SW22. The 1-3 sub-demultiplexer may include the first switch SW13 and the second switch SW23.

Each of the second demultiplexers may include three second sub-demultiplexers. Each of the second sub-demultiplexers may connect one second output line OL2 and two second data lines DL2 to each other through the conductive line TL. The second sub-demultiplexers may include a 2-1 sub-demultiplexer, a 2-2 sub-demultiplexer and a 2-3 sub-demultiplexer. The 2-1 sub-demultiplexer may connect the conductive line TL connected to the second output line OL2 configured to output the red data signal R and second data lines of a pair of red pixel columns to each other. The 2-2 sub-demultiplexer may connect the conductive line TL connected to the second output line OL2 configured to output the green data signal G and second data lines of a pair of green pixel columns to each other. The 2-3 sub-demultiplexer may connect the conductive line TL connected to the second output line OL2 configured to output the blue data signal B and second data lines of a pair of blue pixel columns to each other. The 2-1 sub-demultiplexer may include the third switch SW31 and the fourth switch SW41. The 2-2 sub-demultiplexer may include the third switch SW32 and the fourth switch SW42. The 2-3 sub-demultiplexer may include the third switch SW33 and the fourth switch SW43.

The first portions TL1 of the conductive lines TL may be connected to the third switches SW31, SW32, and SW33 and the fourth switches SW41, SW42, and SW43 of the second demultiplexer. The third portions TL3 of the conductive lines TL may be connected to the second data lines DL2 in the first non-display area NDA1. According to some embodiments, the second data lines DL2 may be electrically connected to the third portion TL3 of the conductive line TL via a conductive layer CL. According to some embodiments, the conductive layer CL may be a portion in which the third portion TL3 of the conductive line TL extends to the first non-display area NDA1. According to some embodiments, the conductive layer CL may be on a different layer from the conductive line TL and the second data line DL2 and may electrically connect the third portion TL3 of the conductive line TL and the second data line DL2 to each other in the first non-display area NDA1.

The output lines OL of the data driving circuit DDRV may have three first output lines OL1 and three second output lines OL2 alternately arranged in the first direction from a left side of the substrate 100. The three first output lines OL1 may output data signals in the order of RGB corresponding to the order in which the first to third pixels PX1, PX2, and PX3 are arranged in the first direction. The three second output lines OL2 may output data signals in the order of BGR, which is a reverse order of RGB, in the first direction. That is, the data driving circuit DDRV may output data signals through the output lines OL in the order of RGB/BGR/RGB/BGR . . . in the first direction from a left side of the substrate 100

According to some embodiments, dummy lines extending in the second direction in correspondence with locations where the first portion TL1 and the third portion TL3 of the conductive line TL are arranged for each column and dummy lines extending in the first direction in correspondence with a location where the second portion TL2 of the conductive line TL is arranged for each row may be further arranged in the fourth area A4 of the display area DA.

Figure 14:
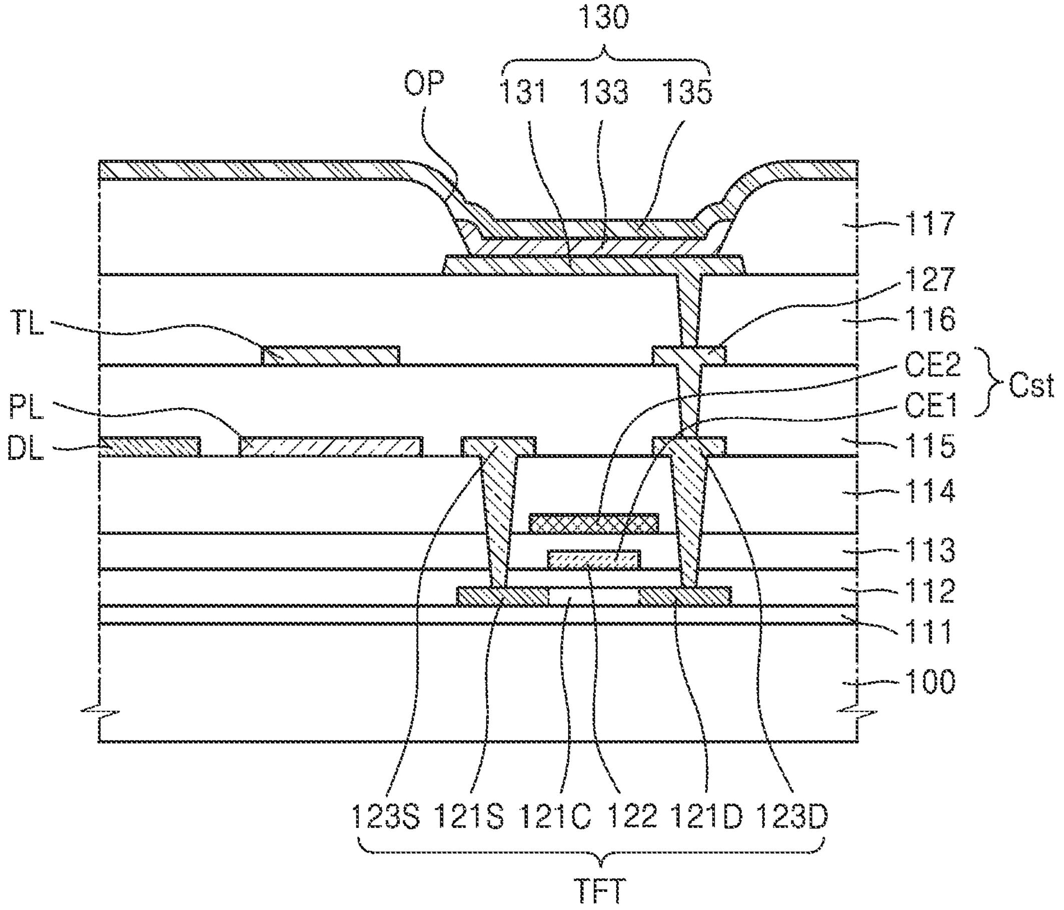
FIG. 14 is a partial cross-sectional view of a display area of a display device according to some embodiments.
Figure 15:
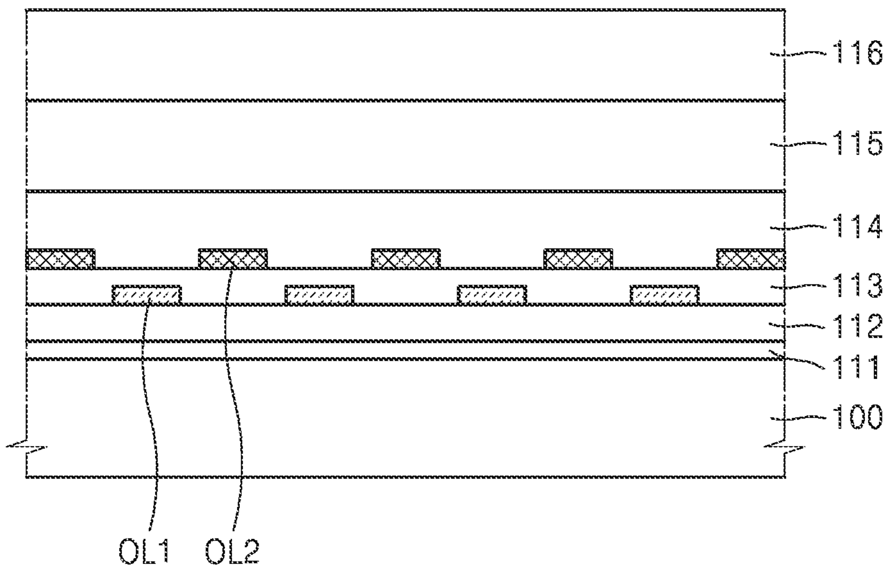
FIG. 15 is a partial cross-sectional view of a peripheral area of a display device according to some embodiments.

FIG. 14 is a partial cross-sectional view of a display area of a display device according to some embodiments. FIG. 15 is a partial cross-sectional view of a peripheral area of a display device according to some embodiments. FIGS. 14 and 15 may show portions of the display device of FIGS. 1 and 12.

The substrate 100 may include various materials such as a glass material, a metal material, or a plastic material. According to some embodiments, the substrate 100 may be a flexible substrate and may include, for example, polymer resin such as polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), or cellulose acetate propionate (CAP). The substrate 100 may have a multi-layer structure including a layer including the above-described polymer resin and an inorganic layer. A buffer layer 111 may be arranged on the substrate 100.

The buffer layer 111 may have a single-layer or multi-layer structure including an inorganic insulating material such as silicon oxide, silicon nitride, or silicon oxynitride. A barrier layer for blocking penetration of external air may be further included between the substrate 100 and the buffer layer 111. The buffer layer 111 may be omitted.

A thin-film transistor TFT may be arranged on the buffer layer 111. The thin-film transistor TFT may include a semiconductor layer, a gate electrode 122, a source electrode 123S, and a drain electrode 123D.

The semiconductor layer may include amorphous silicon, polycrystalline silicon, or an organic semiconductor material. The semiconductor layer may include a source region 121S, a drain region 121D, and a channel region 121C between the source region 121S and the drain region 121D.

A first insulating layer 112 may be arranged between the semiconductor layer and the gate electrode 122. A second insulating layer 113 and a third insulating layer 114 may be arranged between the gate electrode 122 and the source and drain electrodes 123S and 123D. The first insulating layer 112, the second insulating layer 113, and the third insulating layer 114 may include an inorganic material such as silicon oxide, silicon nitride and/or silicon oxynitride.

The source electrode 123S and the drain electrode 123D may be electrically connected to the source region 121S and the drain region 121D of the semiconductor layer, respectively, through contact holes formed in the first insulating layer 112, the second insulating layer 113, and the third insulating layer 114.

The capacitor Cst may include a lower electrode CE1 and an upper electrode CE2 overlapping each other with the second insulating layer 113 therebetween. The capacitor Cst may overlap the thin-film transistor TFT. FIG. 14 shows that the gate electrode 122 of the thin-film transistor TFT is the lower electrode CE1 of the capacitor Cst. According to some embodiments, the capacitor Cst may not overlap the thin-film transistor TFT, and the lower electrode CE1 of the capacitor Cst may be an independent element separate from the gate electrode 122 of the thin-film transistor TFT.

A pixel circuit including the thin-film transistor TFT and the capacitor Cst may be covered by a fourth insulating layer 115 and a fifth insulating layer 116. The fourth insulating layer 115 and the fifth insulating layer 116 are planarization insulating layers and may be organic insulating layers.

Various conductive layers may be further arranged on the third insulating layer 114. For example, the data line DL and the driving voltage line PL may be arranged on the third insulating layer 114, that is, on the same layer as the source electrode 123S and the drain electrode 123D. The data line DL and the driving voltage line PL may include the same material as the source electrode 123S and the drain electrode 123D.

The conductive line TL may be arranged on the fourth insulating layer 115. The first portion TL1 and the third portion TL3 of the conductive line TL may at least partially overlap the data line DL or the driving voltage line PL. The second portion TL2 of the conductive line TL may at least partially overlap one of the scan line SL, the emission control line EL, and the initialization voltage line VIL.

An organic light-emitting diode 130, which is a display element, may be arranged on the fifth insulating layer 116. The organic light-emitting diode 130 may include a pixel electrode 131, an opposite electrode 135, and an intermediate layer 133 between the pixel electrode 131 and the opposite electrode 135. The pixel electrode 131 may be electrically connected to the thin-film transistor TFT through a connection electrode 127 on the fourth insulating layer 115.

A sixth insulating layer 117 covering the edge of the pixel electrode 131 may be arranged on the fifth insulating layer 116. The sixth insulating layer 117 may have an opening OP exposing a portion of the pixel electrode 131 and thus may define a pixel. The sixth insulating layer 117 may include an organic material or an insulating material.

The intermediate layer 133 may be on the pixel electrode 131 exposed by the opening OP of the sixth insulating layer 117. The intermediate layer 133 includes an emission layer.

The emission layer may include a polymer organic material or low-molecular weight organic material that emits light of a certain color. The emission layer may be a red emission layer, a green emission layer, or a blue emission layer. Alternatively, the emission layer may have a multi-layer structure in which a red emission layer, a green emission layer, and a blue emission layer are stacked to emit white light, or may have a single-layer structure including a red luminescent material, a green luminescent material, and a blue luminescent material. According to some embodiments, the intermediate layer 133 may include a first functional layer under the emission layer and/or a second functional layer on the emission layer. The first functional layer and/or the second functional layer may include an integral layer over a plurality of pixel electrodes 131 or may include a layer patterned to correspond to each of the plurality of pixel electrodes 131.

The opposite electrode 135 faces the pixel electrode 131 with the intermediate layer 133 therebetween. The opposite electrode 135 may be a common electrode that is integrally formed in a plurality of organic light-emitting diodes 130 in the display area DA and faces the plurality of pixel electrodes 131.

An encapsulation layer may be arranged on the organic light-emitting diode 130. The encapsulation layer may include at least one inorganic encapsulation layer including an inorganic material and at least one organic encapsulation layer including an organic material. In some embodiments, the encapsulation layer may have a stacked structure of a first inorganic encapsulation layer/an organic encapsulation layer/a second inorganic encapsulation layer. A capping layer covering the opposite electrode 135 may be further arranged between the opposite electrode 135 of the organic light-emitting diode 130 and the encapsulation layer. According to some embodiments, a sealing substrate may be arranged on the organic light-emitting diode 130 to face the substrate 100 and may be attached to the substrate 100 outside the display area DA by a sealing member such as a sealant or a frit.

Some of the plurality of output lines OL arranged in the peripheral area PA may be formed of the same material and on the same layer as the lower electrode CE1 of the capacitor Cst, and the others may be formed of the same material and on the same layer as the upper electrode CE2. For example, as shown in FIG. 15, the first output lines OL1 may be arranged on the first insulating layer 112, and the second output lines OL2 may be arranged on the second insulating layer 113. Accordingly, arrangement spacing of the output lines OL may be reduced, and a non-display area may be reduced.

According to one or more embodiments, as a conductive line for transmitting a data signal to a data line may be arranged in a display area, and a demultiplexer is used, a dead area of a display device may be reduced, and a high-resolution image may be displayed. However, embodiments according to the present disclosure are not limited by such an effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, these are merely examples, and it will be understood by those of ordinary skill in the art that various changes in form and details may be made therein without departing from the spirit and scope as defined by the following claims, and their equivalents.

What is claimed is:

1. A display device comprising:

a substrate comprising a display area and a peripheral area outside the display area;

a plurality of data lines in the display area;

a plurality of conductive lines in the display area;

a data driving circuit in the peripheral area and configured to output a data signal; and a data distribution circuit between the display area and the data driving circuit in the peripheral area, wherein the data distribution circuit comprises:

a plurality of first demultiplexers configured to receive a data signal output via a first output line from the data driving circuit and to transmit the data signal to a pair of first data lines from among the plurality of data lines; and a plurality of second demultiplexers configured to receive, through a corresponding conductive line from among the plurality of conductive lines, a data signal output via a second output line from the data driving circuit and to transmit the data signal to a pair of second data lines from among the plurality of data lines, wherein each of the plurality of second demultiplexers comprises a first switch connected to one of the pair of second data lines and a second switch connected to the other of the pair of second data lines, and wherein the corresponding conductive line is connected between the first switch and the second switch in the peripheral area and a portion of the corresponding conductive line is arranged between the first switch and the second switch in the peripheral area.

2. The display device of claim 1, wherein a length of the display area in a first direction is less than that in a second direction vertical to the first direction, wherein the first direction is an extension direction of the data lines.

3. The display device of claim 1, wherein the peripheral area comprises a first non-display area surrounding the display area and a second non-display area outside the first non-display area, wherein the data distribution circuit is in the first non-display area, and wherein the data driving circuit is in the second non-display area.

4. The display device of claim 1, wherein each of the conductive lines comprises a first portion and a third portion extending in an extension direction of the data lines and a second portion connecting the first portion and the third portion to each other, wherein the first portion and the third portion face each other, wherein the third portion is closer to an edge of the substrate than the first portion is.

5. The display device of claim 4, wherein each of the conductive lines comprises the first portion connected to the second output line and the third portion connected to a second demultiplexer.

6. A display device comprising:

a substrate comprising a display area and a peripheral area outside the display area;

a plurality of data lines in the display area;

a plurality of conductive lines in the display area;

a data driving circuit in the peripheral area and configured to output a data signal; and a data distribution circuit between the display area and the data driving circuit in the peripheral area, wherein the data distribution circuit comprises:

a plurality of first demultiplexers configured to receive a data signal output via a first output line from the data driving circuit and to transmit the data signal to a pair of first data lines from among the plurality of data lines; and a plurality of second demultiplexers configured to receive, through a corresponding conductive line from among the plurality of conductive lines, a data signal output via a second output line from the data driving circuit and to transmit the data signal to a pair of second data lines from among the plurality of data lines, wherein the data driving circuit is configured to output first to third color data signals in an arrangement order of first data lines of first to third columns in a direction along a row, respectively, via a plurality of first output lines and configured to output first to third color data signals in a reverse order of an arrangement of second data lines of first to third columns in the direction along the row, respectively, via a plurality of second output lines.

7. The display device of claim 1, wherein the display area comprises a first sub-area in which a plurality of first data lines from among the plurality of data lines are arranged and a second sub-area in which a plurality of second data lines from among the plurality of data lines are arranged, wherein the second sub-area is closer to an edge of the substrate than the first sub-area is.

8. The display device of claim 7, wherein each of the conductive lines comprises a first portion in the first sub-area that is parallel to the first data lines, a third portion in the second sub-area that is parallel to the second data lines, and a second portion connecting the first portion and the third portion to each other.

9. The display device of claim 8, wherein the first portion is connected to the second output line, wherein the third portion is connected to a second demultiplexer.

10. The display device of claim 7, further comprising a plurality of dummy lines arranged in columns of the first sub-area where first portions of the conductive lines are not arranged and columns of the second sub-area where third portions of the conductive lines are not arranged.

11. A display device comprising:

a plurality of data lines in a display area;

a plurality of conductive lines in the display area;

a data driving circuit in a peripheral area outside the display area and configured to output a data signal; and a data distribution circuit in the peripheral area and configured to transmit the data signal to the data lines, wherein each of the conductive lines comprises a first portion and a third portion extending in a first direction in which the data lines extend and a second portion connecting the first portion and the third portion to each other, wherein the display area comprises a first sub-area in which first portions of the conductive lines are arranged and a second sub-area in which third portions of the conductive lines are arranged, wherein the data distribution circuit comprises:

a plurality of first demultiplexers configured to transmit a data signal received from the data driving circuit to first data lines in the first sub-area from among the data lines; and a plurality of second demultiplexers configured to transmit a data signal received from the data driving circuit to second data lines in the second sub-area from among the data lines through the conductive lines, wherein each of the second demultiplexers comprises a first switch configured to be turned on according to a first control signal and a second switch configured to be turned on according to a second control signal, wherein the first switch is connected to one of a pair of second data lines among the second data lines and the second switch is connected to the other of the pair of second data lines, and wherein each of the conductive lines is connected between the first switch and the second switch in the peripheral area and a portion of each of the conductive lines is arranged between the first switch and the second switch in the peripheral area.

12. The display device of claim 11, wherein a length of the display area in the first direction is less than that in a second direction vertical to the first direction.

13. The display device of claim 11, wherein the peripheral area comprises a first non-display area surrounding the display area and a second non-display area outside the first non-display area, wherein the data distribution circuit is in the first non-display area, and wherein the data driving circuit is in the second non-display area.

14. The display device of claim 13, wherein the second sub-area is outside the first sub-area, wherein the second non-display area corresponds to the first sub-area and has no portion corresponding to the second sub-area.

15. A display device comprising:

a plurality of data lines in a display area;

a plurality of conductive lines in the display area;

a data driving circuit in a peripheral area outside the display area and configured to output a data signal; and a data distribution circuit in the peripheral area and configured to transmit the data signal to the data lines, wherein each of the conductive lines comprises a first portion and a third portion extending in a first direction in which the data lines extend and a second portion connecting the first portion and the third portion to each other, wherein the display area comprises a first sub-area in which first portions of the conductive lines are arranged and a second sub-area in which third portions of the conductive lines are arranged, wherein the data distribution circuit comprises:

a plurality of first demultiplexers configured to transmit a data signal received from the data driving circuit to first data lines in the first sub-area from among the data lines; and a plurality of second demultiplexers configured to transmit a data signal received from the data driving circuit to second data lines in the second sub-area from among the data lines through the conductive lines, wherein the data driving circuit is configured to output first to third color data signals in an arrangement order of first data lines of first to third columns in a direction along a row, respectively, and configured to output first to third color data signals in a reverse order of an arrangement of second data lines of first to third columns in the direction along the row, respectively.

16. The display device of claim 15, wherein each of the first demultiplexers comprises:

a 1-1 sub-demultiplexer between a first output line configured to output the first color data signal and a pair of first data lines configured to receive the first color data signal;

a 1-2 sub-demultiplexer between a first output line configured to output the second color data signal and another pair of first data lines configured to receive the second color data signal; and a 1-3 sub-demultiplexer between a first output line configured to output the third color data signal and another pair of first data lines configured to receive the third color data signal.

17. The display device of claim 15, wherein each of the second demultiplexers comprises:

a 2-1 sub-demultiplexer between a first conductive line connected to a second output line configured to output the first color data signal and configured to receive the first color data signal and a pair of second data lines;

a 2-2 sub-demultiplexer between a second conductive line connected to a second output line configured to output the second color data signal and configured to receive the second color data signal and another pair of second data lines; and a 2-3 sub-demultiplexer between a third conductive line connected to a second output line configured to output the third color data signal and configured to receive the third color data signal and another pair of second data lines.

18. The display device of claim 11, wherein each of the first demultiplexers comprise a third switch configured to be turned on according to the first control signal and a fourth switch configured to be turned on according to the second control signal applied at a different timing from the first control signal.

19. The display device of claim 11, wherein the first portion of each of the conductive lines is connected to an output line of the data driving circuit, wherein the third portion of each of the conductive lines is connected to a corresponding second demultiplexer from among the plurality of second demultiplexers.

20. The display device of claim 11, further comprising a plurality of dummy lines arranged in columns of the first sub-area where the first portions of the conductive lines are not arranged and columns of the second sub-area where the third portions of the conductive lines are not arranged.

21. The display device of claim 1, wherein a bending area is between the data driving circuit and the data distribution circuit.

22. The display device of claim 11, wherein a bending area is between the data driving circuit and the data distribution circuit.

* * * * *